United States Patent
Vajapeyam et al.

(10) Patent No.: US 9,999,039 B2
(45) Date of Patent: Jun. 12, 2018

(54) SEMI-PERSISTENT SCHEDULING FOR ENHANCED MACHINE TYPE COMMUNICATIONS

(71) Applicant: QUALCOMM Incorporated, San Diego, CA (US)

(72) Inventors: Madhavan Srinivasan Vajapeyam, San Diego, CA (US); Wanshi Chen, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 15/215,809

(22) Filed: Jul. 21, 2016

(65) Prior Publication Data
US 2017/0026942 A1 Jan. 26, 2017

Related U.S. Application Data

(60) Provisional application No. 62/196,223, filed on Jul. 23, 2015.

(51) Int. Cl.
*H04W 72/04* (2009.01)
*H04W 72/12* (2009.01)

(52) U.S. Cl.
CPC .......... *H04W 72/042* (2013.01); *H04W 4/70* (2018.02); *H04W 72/04* (2013.01); *H04W 72/0446* (2013.01); *H04W 72/1289* (2013.01)

(58) Field of Classification Search
None
See application file for complete search history.

(56) References Cited

U.S. PATENT DOCUMENTS

2013/0250924 A1* 9/2013 Chen ............... H04L 1/1819
370/336
2014/0098761 A1* 4/2014 Lee ............... H04W 74/006
370/329

(Continued)

FOREIGN PATENT DOCUMENTS

WO WO-2015051504 A1 4/2015

OTHER PUBLICATIONS

ISA/EP, International Search Report and Written Opinion of the International Searching Authority, Int'l Application No. PCT/US2016/043461, dated Oct. 5, 2016, 15 pgs., European Patent Office, Rijswijk, NL.

*Primary Examiner* — Eunsook Choi
(74) *Attorney, Agent, or Firm* — Holland & Hart LLP

(57) ABSTRACT

Methods, systems, and devices for wireless communication are described. Semi-persistent scheduling (SPS) may be used for communication with various wireless communication devices, including machine-type communication (MTC) devices, to reduce overhead on control channels. Data transmissions scheduling using SPS techniques may be repeated and bundled together to effect coverage enhancement (CE) for devices with poor radio quality conditions. SPS communication may be used in both uplink and downlink transmissions. An SPS configuration may include a predefined number of scheduled transmission periods and a CE level, which may be established in either an SPS configuration message or as part of the SPS activation message from a base station. A device may identify the CE level of the transmissions and, in some cases, may determine the periodicity of the SPS based on the CE level. Bundled transmissions assigned with SPS may be prioritized with respect to one another or dynamically assigned resources.

52 Claims, 18 Drawing Sheets

(56) References Cited

U.S. PATENT DOCUMENTS

| | | |
|---|---|---|
| 2014/0126492 A1 | 5/2014 | Gleixner |
| 2015/0009371 A1 | 1/2015 | Araoka |
| 2015/0109972 A1 | 4/2015 | Khoryaev et al. |
| 2016/0029239 A1* | 1/2016 | Sadeghi .............. H04W 52/244 370/252 |
| 2016/0227517 A1 | 8/2016 | Han |
| 2016/0330633 A1* | 11/2016 | You ........................... H04L 1/00 |
| 2017/0142620 A1* | 5/2017 | Rune ................ H04W 36/0072 |
| 2017/0331595 A1* | 11/2017 | Rudolf ................. H04L 1/1678 |

* cited by examiner

SEMI-PERSISTENT SCHEDULING FOR ENHANCED MACHINE TYPE COMMUNICATIONS

CROSS REFERENCES

The present application for patent claims priority to U.S. Provisional Patent Application No. 62/196,223 by Vajapeyam et al., entitled "Semi-Persistent Scheduling for Enhanced Machine Type Communications," filed Jul. 23, 2015, assigned to the assignee hereof.

BACKGROUND

The following relates generally to wireless communication and more specifically to semi-persistent scheduling (SPS) for machine-type communication (MTC) or enhanced MTC (eMTC) devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Low-cost, low-complexity devices such as machine-type communication (MTC) devices, may send or receive regular data transmissions that may be small in size. For these regular transmissions, control channel information may constitute large amount of overhead relative to the size of the transmission.

SUMMARY

Semi-persistent scheduling (SPS) may be used for communication with MTC devices to, for example, reduce overhead on control channels. Data transmissions scheduled using SPS may also be repeated or bundled to effect coverage enhancement (CE) for devices that that have poor radio link conditions. Both uplink and downlink transmissions may be scheduled using SPS. An SPS configuration may include a predefined number of scheduled transmission periods, which may be established in either an SPS configuration message or as part of the SPS activation message from a base station. A device, such as an MTC device, may identify CE level (e.g., a repetition level) of the transmissions and, in some cases, may determine the periodicity of the SPS-assigned resources based on the CE level. Resources assigned using SPS may be prioritized with respect to one another or with respect to dynamically assigned resources. In some cases, resources assigned using SPS may be dropped when they are determined to overlap with dynamically assigned resources.

A method of wireless communication is described. The method may include receiving signaling that indicates a configuration for an SPS, receiving a downlink control message that activates the SPS, determining a coverage enhancement level for resources assigned by the SPS based at least in part on the configuration or the downlink control message, and communicating with a base station on the resources assigned by the SPS according to the coverage enhancement level.

An apparatus for wireless communication is described. The apparatus may include means for receiving signaling that indicates a configuration for an SPS, means for receiving a downlink control message that activates the SPS, means for determining a coverage enhancement level for resources assigned by the SPS based at least in part on the configuration or the downlink control message, and means for communicating with a base station on the resources assigned by the SPS according to the coverage enhancement level.

A further apparatus for wireless communication is described. The apparatus may include a processor, memory in electronic communication with the processor, and instructions stored in the memory and operable, when executed by the processor, to cause the apparatus to receive signaling that indicates a configuration for an SPS, receive a downlink control message that activates the SPS, determine a coverage enhancement level for resources assigned by the SPS based at least in part on the configuration or the downlink control message, and communicate with a base station on the resources assigned by the SPS according to the coverage enhancement level.

A non-transitory computer-readable medium storing code for wireless communication is described. The code may include instructions executable to receive signaling that indicates a configuration for an SPS, receive a downlink control message that activates the SPS, determine a coverage enhancement level for resources assigned by the SPS based at least in part on the configuration or the downlink control message, and communicate with a base station on the resources assigned by the SPS according to the coverage enhancement level.

Some examples of the method, apparatuses, or non-transitory computer-readable medium described herein may further include processes, features, means, or instructions for determining a periodicity of the resources assigned by the SPS based at least in part on the coverage enhancement level. Additionally or alternatively, in some examples the configuration for the SPS includes a plurality of SPS periodicities, and determining the periodicity of the resources assigned by the SPS comprises selecting the periodicity from the plurality of SPS periodicities based at least in part on the coverage enhancement level.

Some examples of the method, apparatuses, or non-transitory computer-readable medium described herein may further include processes, features, means, or instructions for determining that an uplink data buffer is empty during a transmission period of the configuration, wherein the configuration comprises an uplink SPS configuration, and refraining from transmitting on the resources assigned by the SPS during the transmission based at least in part on the determination that the uplink data buffer is empty. Some examples may include processes, features, means, or instructions for receiving an indication to determine whether the uplink data buffer is empty during the transmission period of the configuration, and the refraining from transmitting may be based at least in part on the indication. Additionally or alternatively, some examples may include processes, features, means, or instructions for incrementing a counter based at least in part on the refraining from transmitting on the resources, determining that the counter has value that exceeds a threshold, and releasing the SPS activation based at least in part on the determination that the counter exceeds the threshold.

Some examples of the method, apparatuses, or non-transitory computer-readable medium described herein may further include processes, features, means, or instructions for receiving a second downlink control message that comprises a dynamic assignment of resources, and determining that the resources assigned by the dynamic assignment overlap with the resources assigned by the SPS. Additionally or alternatively, some examples may include processes, features, means, or instructions for communicating based at least in part on the dynamic assignment, and refraining from communicating on at least a portion of the resources assigned by the SPS based at least in part on the determination that the resources assigned by the dynamic assignment overlap with the resources assigned by the SPS.

In some examples of the method, apparatuses, or non-transitory computer-readable medium described herein, the resources assigned by the SPS includes bundled transmission time intervals (TTIs), and the refraining from communicating comprises refraining from communicating for at least one bundle of TTIs. Additionally or alternatively, some examples may include processes, features, means, or instructions for releasing the SPS activation based at least in part on determining that the additional resources overlap with the resources assigned by the SPS.

Some examples of the method, apparatuses, or non-transitory computer-readable medium described herein may further include processes, features, means, or instructions for refraining from communicating on the resources assigned by the dynamic assignment based at least in part on determining that the additional resources overlap with the resources assigned by the SPS. Additionally or alternatively, in some examples the refraining from communicating is based at least in part on whether the configuration comprises an uplink configuration or a downlink configuration.

In some examples of the method, apparatuses, or non-transitory computer-readable medium described herein, the configuration includes an uplink SPS configuration and a downlink SPS configuration, and determining that resources assigned by the SPS include overlapping uplink resources and downlink resources. Additionally or alternatively, in some examples communicating with the base station comprises refraining from communicating on at least a portion of the uplink resources or the downlink resources.

Some examples of the method, apparatuses, or non-transitory computer-readable medium described herein may further include processes, features, means, or instructions for prioritizing the uplink resources or the downlink resources for communication, and communicating with the base station comprises communicating based at least in part on the prioritization. Additionally or alternatively, in some examples determining the coverage enhancement level includes selecting a coverage enhancement level from a set of coverage enhancement levels, where the set includes a level that corresponds to no coverage enhancements.

A method of wireless communication is described. The method may include transmitting signaling that indicates a configuration for an SPS, transmitting a downlink control message that activates the SPS, where the configuration or the downlink control message indicates a coverage enhancement level, and communicating with a UE on resources assigned by the SPS according to the coverage enhancement level.

A further apparatus for wireless communication is described. The apparatus may include means for transmitting signaling that indicates a configuration for an SPS, means for transmitting a downlink control message that activates the SPS, wherein the configuration or the downlink control message indicates a coverage enhancement level, and means for communicating with a UE on resources assigned by the SPS according to the coverage enhancement level.

A further apparatus for wireless communication is described. The apparatus may include a processor, memory in electronic communication with the processor, and instructions stored in the memory and operable, when executed by the processor, to cause the apparatus to transmit signaling that indicates a configuration for an SPS, transmit a downlink control message that activates the SPS, wherein the configuration or the downlink control message indicates a coverage enhancement level, and communicate with a UE on resources assigned by the SPS according to the coverage enhancement level.

A non-transitory computer-readable medium storing code for wireless communication is described. The code may include instructions executable to transmit signaling that indicates a configuration for an SPS, transmit a downlink control message that activates the SPS, where the configuration or the downlink control message indicates a coverage enhancement level, and communicate with a UE on resources assigned by the SPS according to the coverage enhancement level.

Some examples of the method, apparatuses, or non-transitory computer-readable medium described herein may further include processes, features, means, or instructions for identifying a set of periodicities for each of a plurality of coverage enhancement levels, and selecting a periodicity from each set of periodicities, wherein the configuration for the SPS comprises the periodicity from each set. Additionally or alternatively, some examples may include processes, features, means, or instructions for transmitting a second downlink control message that comprises a dynamic assignment of resources, wherein the dynamic assignment may overlap with the resources assigned by the SPS, and communicating with the UE comprises communicating may be based at least in part on the dynamic assignment of resources. In some examples, the signaling that indicates the configuration for SPS may include an indication for the UE to refrain from transmitting during a transmission period of the configuration when an uplink data buffer of the UE is empty.

BRIEF DESCRIPTION OF THE DRAWINGS

Aspects of the disclosure are described in reference to the following figures.

DETAILED DESCRIPTION

Figure 1:
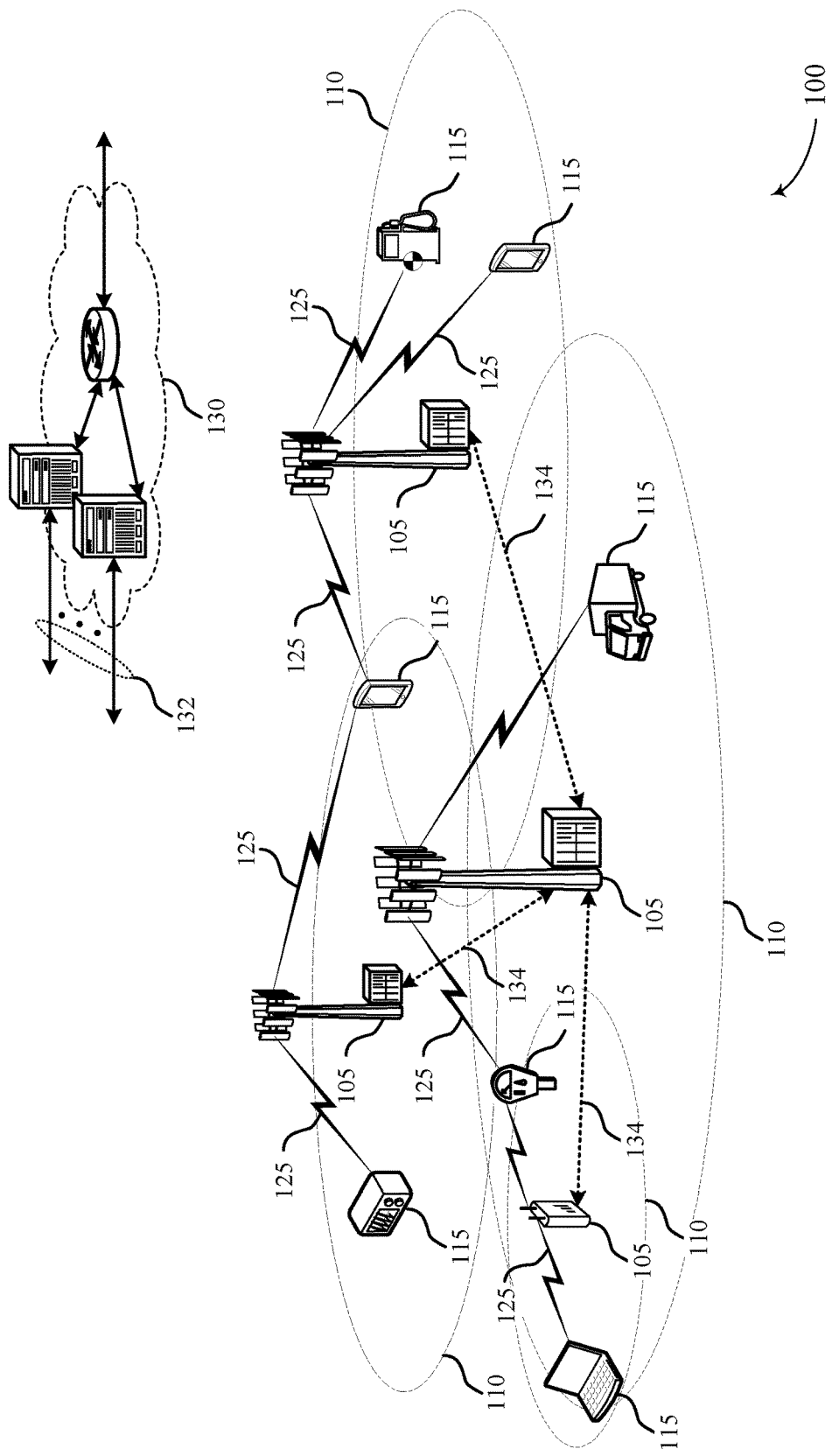
FIG. 1 illustrates an example of a wireless communications system that supports semi-persistent scheduling (SPS) for enhanced machine-type communication (eMTC) in accordance with various aspects of the present disclosure.

Some wireless systems may support coverage enhancement (CE) for communication between a user equipment (UE) and base station by transmitting repeated information in groups known as bundles. In some cases, CE may include bundling (e.g., repeating instances of) transmissions in order to ensure quality transmission for UEs that are operating under poor channel quality conditions. Some wireless systems may also use semi-persistent scheduling (SPS) to transmit periodic information (which may or may not be bundled) between devices, such as UEs and base stations. Some wireless systems, including those described herein, may thus support low-power, low-complexity devices (e.g., machine-type communication (MTC) devices) by employing SPS and CE.

The transmissions from and to low-cost or low-complexity devices may include relatively small amounts of data, and using SPS may reduce the amount of overhead for control channels associated with that data. Low-cost or low-complexity devices, such as MTC devices, may also use narrowband half-duplex unicast transmission for both physical downlink shared channel (PDSCH) and physical uplink shared channel (PUSCH). Thus, the MTC devices may be limited to either transmit or receive at a given time.

As described below, SPS activation and information related to CE, including levels of transmission repetition, may be dynamically indicated using an uplink or downlink grant or with higher signaling, or both. A periodicity and a bundle size (i.e., a CE level) for SPS-based communication may be configured for a specific device when the device establishes a radio connection or when SPS is activated (e.g., with a grant).

To facilitate SPS-based communication with some MTC devices, for example, an SPS period may be larger than a bundle size (e.g., a number of repeated transmissions) because bundled transmissions may be transmitted at reoccurring SPS periods. For some systems, including those configured to employ SPS without CE, a range of values of SPS may be insufficient to accommodate all bundle sizes (e.g., CE levels). Thus, as described herein, SPS periodicity may be modified or established based on CE levels employed within a system.

In some wireless systems, including those that employ SPS primarily for higher-complexity devices or user-intensive operation (e.g., voice over Internet protocol (VoIP)), a UE may transmit padding bits if no data is available during an SPS-assigned uplink transmission period. Transmitting the padding may, however, be inefficient for power and resource management, especially if large bundling is used. Thus, as described herein, UEs and MTC devices may be configured to refrain from transmitting during SPS-assigned uplink transmission periods if, for example, an uplink data buffer is empty. So rather than transmitting padding, a UE or MTC device may conserve resources by refraining from transmitting if it does not have data to send. In some cases, a UE or MTC device that refrains from uplink transmissions during SPS-assigned transmission periods for multiple instances may releases its SPS assignment.

UEs and MTC devices may use both SPS-assigned resources and dynamically assigned resources. In some cases, a UE may receive a dynamic assignment for resources that overlap in the time domain with existing SPS-assigned resources. Due to bundling (e.g., for CE), such overlapping may be more prevalent or may result in assigned resources that partially overlap. If there is an overlap of SPS-assigned resources with dynamically assigned resources, a UE or base station may determine rules for transmitting using one or both of the assignments. For example, the SPS assignment may be released or it may remain configured. In some cases, SPS-assigned uplink and downlink resources may overlap, and rules may be employed to prioritize transmissions.

Aspects of the disclosure introduced above are further described below in the context of a wireless communication system. Specific examples are then described for SPS configurations and for resource prioritization when assigned resources overlap. These and other aspects of the disclosure are further illustrated by and described with reference to apparatus diagrams, system diagrams, and flowcharts that relate to SPS for eMTC.

FIG. 1 illustrates an example of a wireless communications system 100 that supports SPS for eMTC in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-Advanced (LTE-A) network. Wireless communications system 100 may support SPS for MTC devices to reduce the control signaling overhead.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, an MTC device or the like.

MTC devices may provide for automated wireless communication, which may include those implementing Machine-to-Machine (M2M) communication. M2M or MTC may refer to data communication technologies that allow devices to communicate with one another or a base station 105 without human intervention. For example, M2M or MTC may refer to communications from devices that integrate sensors or meters to measure or capture information and relay that information to a central server or application program that can make use of the information or present the information to humans interacting with the program or application. Some UEs 115 that may be MTC devices may be those designed to collect information or enable automated behavior of machines. UEs 115 that are MTC devices may include the low cost or low-complexity devices mentioned above and may communicate in uplink and downlink using coverage enhancement techniques.

Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, wireless communication system 100 may utilize coverage enhancement (CE) techniques to improve the quality of a communication link 125 for UEs 115 located at a cell edge, operating with low power transceivers, or experiencing high interference or path loss. CE techniques may include repeated transmissions, transmission time interval (TTI) bundling, HARQ retransmission, physical uplink shared channel (PUSCH) hopping, beamforming, power boosting, or other techniques. The CE techniques used may depend on the specific needs of UEs 115 in different circumstances. For example, TTI bundling may involve sending multiple copies of the same information in a group of consecutive TTIs rather than waiting for a negative acknowledgement (NACK) before retransmitting redundancy versions. TTI bundling may be effective for communicating when a channel quality between devices is poor or, in other cases, may be effective for users engaging in voice over Long Term evolution (VoLTE) or VOIP communications.

In some examples, CE may include increasing the number of HARQ retransmissions. Uplink data transmissions may also be transmitted using frequency hopping to achieve frequency diversity. Additionally or alternatively, beamforming may be used to increase the strength of a signal in a particular direction, or the transmission power may simply be increased. In some cases, one or more CE options may be combined and CE levels may be defined based on a number of decibels the techniques are expected to improve a signal (e.g., no CE, 5 dB CE, 10 dB CE, 15 dB CE, etc.), and each CE level may be associated with one or more of a number of TTI bundling repetitions, frequency hopping, or beam forming.

Wireless communications system 100 may use control signaling to communication with UEs 115. For example, PDCCH may carry downlink control information (DCI) in control channel elements (CCEs), which may consist of nine logically contiguous resource element groups (REGs), where each REG contains 4 resource elements (REs). DCI may include information regarding downlink (DL) scheduling assignments, uplink (UL) resource grants, transmission scheme, UL power control, hybrid automatic repeat request (HARD) information, modulation and coding scheme (MCS) and other information. SPS activation messages may be included in DCI.

The size and format of the DCI messages can differ depending on the type and amount of information that is carried by the DCI. For example, if spatial multiplexing is supported, the size of the DCI message is large compared to contiguous frequency allocations. Similarly, for a system that employs multiple input multiple output (MIMO), the DCI may include additional signaling information. DCI size and format depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a cell radio network temporary identity (C-RNTI) and cyclic redundancy check (CRC) bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space.

The search space can be partitioned into two regions: a common CCE region or search space and a UE-specific (dedicated) CCE region or search space. The common CCE region is monitored by all UEs served by a base station 105 and may include information such as paging information, system information, random access procedures, and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

As mentioned above, a base station 105 and a UE 115 may utilize semi-persistent scheduling (SPS) to reduce control signaling overhead. SPS may involve establishing a regular pattern of scheduled resources with a given periodicity and may be used for a predefined period of time. That is, a UE 115 may be pre-configured by the eNB with an SPS radio network temporary identity (SPS-RNTI) and a periodicity. If a UE 115 receives an allocation using the SPS-RNTI (instead of the typical C-RNTI), then the allocation may be repeated according to the pre-configured periodicity. During SPS, some parameters may remain fixed such as RB assignments and Modulation and Coding Scheme (MCS). Because of this, if the radio link conditions change, a new allocation may be sent.

Some allocations, such as incremental redundancy (i.e., subsequent HARQ transmissions), may be separately scheduled using dynamic scheduling. In some cases (e.g., based on a conflict with dynamic scheduling or when a data transfer is completed) the SPS may be deactivated using explicit signaling, predetermined rules, or based on an inactivity timer.

SPS may be used for communication with UEs 115, such as MTC devices. Data transmissions may also be repeated and bundled together during each SPS period to effect CE, which may mitigate poor radio conditions. SPS-assigned communications may be used in both uplink and downlink transmissions. An SPS configuration may include a pre-defined number of iterations, which may be established in either an SPS configuration message or as part of the SPS activation message from a base station. The UE 115 may identify the CE level of the transmissions, and in some cases may determine the periodicity of the SPS based on the CE level.

Figure 2:
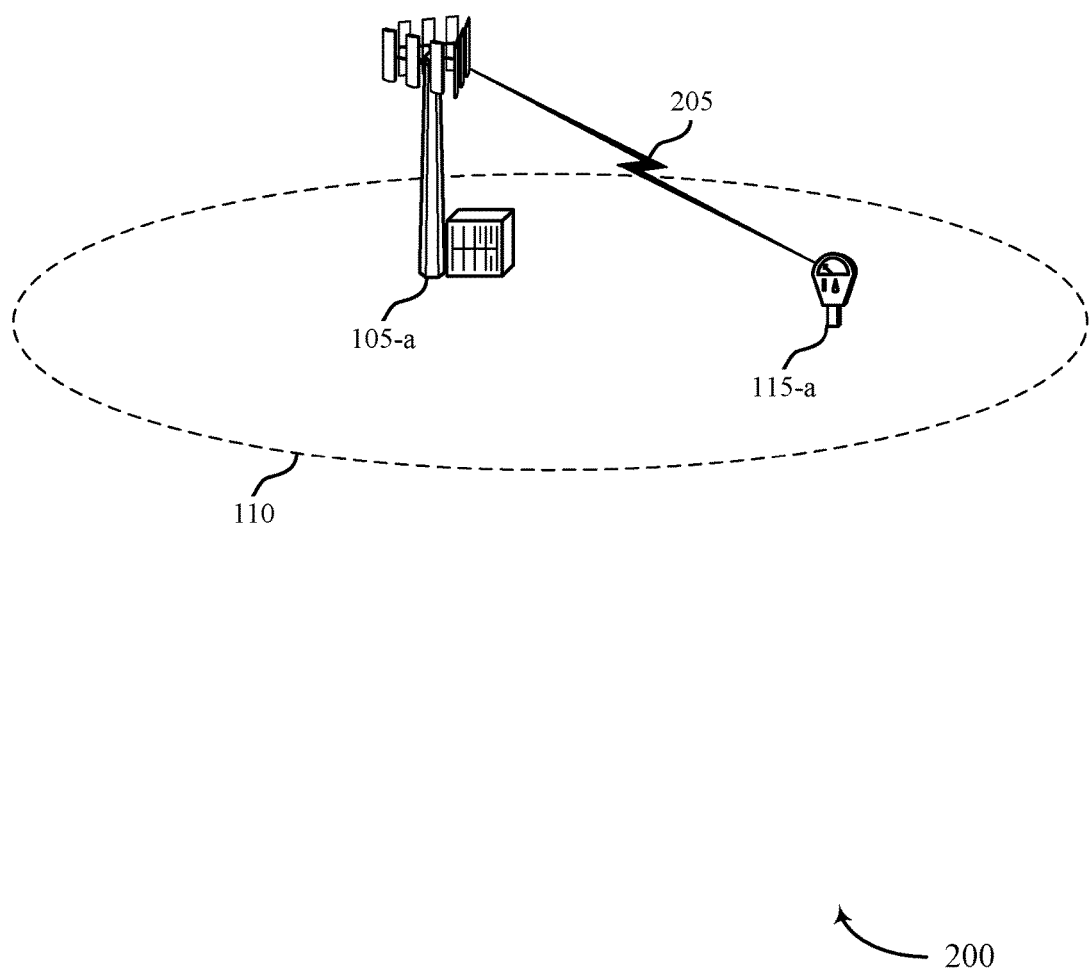
FIG. 2 illustrates an example of a wireless communications system that supports SPS for eMTC in accordance with various aspects of the present disclosure.

FIG. 2 illustrates an example of a wireless communications system 200 that supports SPS for eMTC in accordance with various aspects of the present disclosure. Wireless communications system 200 may include a UE 115-a and base station 105-a, which may be examples of a UE 115 base station 105 described with reference to FIG. 1. Wireless communications system 200 may support SPS for UE 115-a (which may be an MTC device) to reduce the control signaling overhead.

Wireless communications system 200 may support CE for communication between UE 115-a and base station 105-a by transmitting repeated information (i.e., a bundle) in consecutive TTIs. In some cases, the information may be bundled in order to increase the likelihood that transmissions will be successfully received under poor channel quality conditions. Wireless communications system 200 may SPS to transmit periodic information, for example a bundle of TTIs, between devices, such as UE 115-a and base station 105-a. Wireless communications system 200 may support low power, low complexity devices (e.g, MTC devices) using SPS transmission. The transmission may include relatively small amounts of information, and using SPS may reduce the amount of overhead appropriate for the physical downlink control channel (PDCCH).

Wireless communications system 200 may support narrowband half-duplex unicast transmission for low cost and CE for both physical downlink shared channel (PDSCH) and physical uplink shared channel (PUSCH). For low cost, UE 115-a have limited ability or may be unable to transmit and receive at the same time. For CE, the amount of repetition may be dynamically indicated in an uplink or downlink grant. The amount of repetition may be based on a set of pre-defined values, which may be explicitly or implicitly configured. The dynamic indication may be sent through an existing downlink control (DCI) field which may reused for the indication or through a new DCI field.

To use SPS-assigned resources, which may be referred to as SPS communication, the SPS communication may first be established between UE 115-a and base station 105-a. The SPS communication may be configured and activated by higher layer signaling or with physical channel messages, or both sent to UE 115-a from base station 105-a. The configuration information may include repetition information for SPS assignments, where the repetition information may include a number of times for SPS information to be repeated in a bundle. In some cases, SPS configuration information and activation may be indicated in grant on PDCCH. In some cases, the SPS communication may be configured by upper layers of the wireless system, for example as part of the SPS configuration message in radio resource control (RRC).

Once SPS communication is established, a periodicity and a bundle size "n" of the SPS communication may be configured. As discussed above, the SPS period to be larger than the bundle size, as the bundle may be transmitted at, for example, reoccurring SPS periods. System 200 may thus use multiple sets of SPS periodicities depending, for example, on a CE level or TTI bundle size of SPS-assigned transmissions.

By way of example, in order to manage appropriate SPS periodicity, multiple sets of SPS periodicities may be defined. Each set may correspond to a repetition level and may contain a list, for example, of possible SPS periodicities. In some examples, two bits may be used to represent four possible repetition levels, with each list having N values. One set may contain periodicities p11 through p1N. A second set may contain periodicities p21 through p2N. A third set may contain periodicities p31 through p3N. A fourth set may contain periodicities p41 through p4N. These four sets may be referred to, respectively, as set 1 through set 4.

A UE 115 may be configured by RRC with multiple SPS periodicities. For example, UE 115-a may have an SPS configured for one of each possible repetition level. UE 115-a may transmit, for example, at a first periodicity taken from set 1, a second periodicity taken from set 2, a third periodicity from set 3, a fourth periodicity taken from set 4, or any combination of those periodicities. Based on the repetition level indicated in the SPS activation grant, UE 115-a may be aware of its configured SPS periodicity, where a number of bits, for example two, in the activation grant may indicate the SPS period and the SPS bundling.

In some cases, UEs may transmit padding bits if insufficient uplink data is available to send during an uplink transmission period of SPS-assigned resources. Transmitting the padding may be inefficient power and resource management, especially if large bundling is used. So UE 115-a may be configured to transmit on SPS-assigned uplink resources when uplink data is available for transmission, and UE 115-a may refrain from transmitting during uplink transmission periods otherwise. For example, if the UE 115-a has information in the buffer it may transmit on SPS-assigned uplink resources. If UE 115-a has an empty buffer during an uplink transmission interval, it my refrain from transmitting. As described further below, the UE 115-a may update an SPS implicit release counter by 1 when not performing an SPS transmission due to an empty buffer, where a bundled occasion may be considered 1 SPS transmission attempt, for instance.

Some wireless systems, including system 200, may use both SPS-assigned and dynamically assigned resources. In some cases, a UE 115 may receive a dynamic assignment overlapping in the time domain with a prior SPS assignment. Due to bundling, the transmissions may partially overlap in some cases. The dynamic assignment may have the same or different bundling size as the SPS assignment.

By way of example, if there is an overlap of SPS-assigned resources with the dynamic assignment, the dynamic assignment may, in some cases, take precedence. If the dynamic assignment takes precedence, the overlapped SPS assignment may be overridden. In some cases, overriding the SPS assignment may include overriding in the overlapped portion and remaining valid in the non-overlapped portions. In another case, overriding the SPS assignment may include overriding the whole SPS bundle.

If an SPS assignment and a dynamic assignment overlap, the SPS assignment may be released, or it may remain configured. If the SPS assignment is released, the SPS transmission may stop and not transmit unless the UE 115 reconfigures it. If the SPS assignment remains configured, the SPS assignment may transmit again during the next SPS period. In some cases, the UE 115 may ignore an overlapping dynamic assignment completely, for example by skipping grant monitoring or treating the overlap as an error case. Ignoring the dynamic assignment may be appropriate for certain types of SPS assignment; for instance, based on whether the SPS communication is through an uplink or a downlink.

UE 115-a may have a limited ability to perform uplink transmission and downlink reception or monitoring at the same time. Since a bundling size of SPS-assigned resources may be dynamically changed during activation or, in some cases, re-activation, overlapping uplink and downlink SPS-assigned resources may occur. System 200 may prioritize one of the assignments or the other, treating one assignment as valid during a non-overlapped portion, for instance; or by prioritizing one of the assignments and considering the others as invalid for each TTI of bundle that is at least partially overlapped.

Figure 3A:
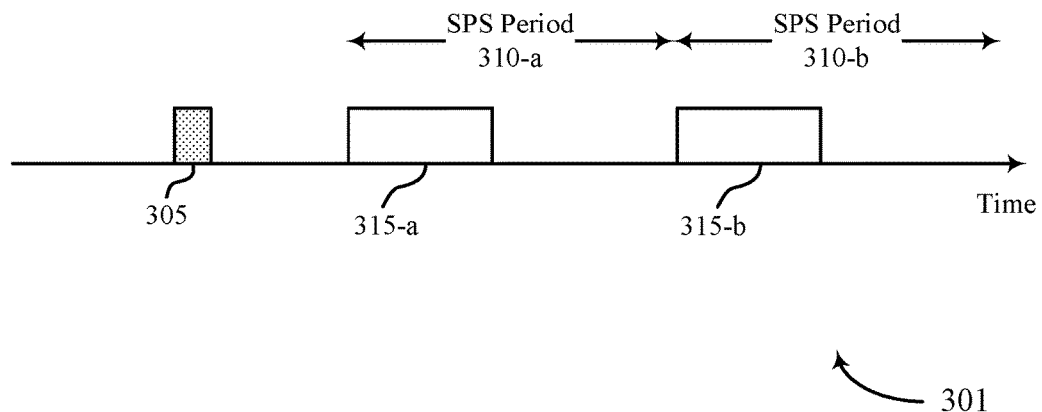
FIGS. 3A and 3B illustrate examples of SPS configuration and activation within systems that support SPS for eMTC in accordance with various aspects of the present disclosure.
Figure 3B:
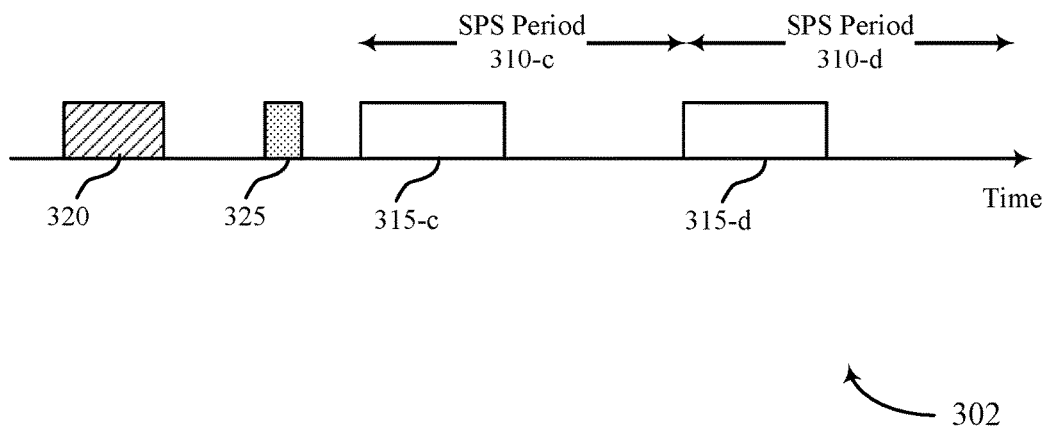
Figure 4A:
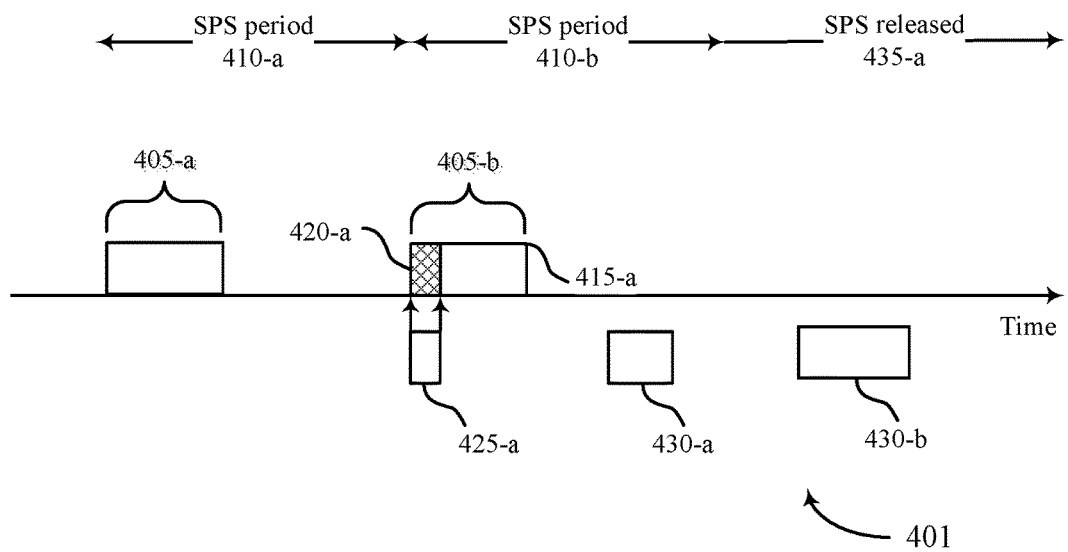
FIGS. 4A, 4B, 4C, and 4D illustrate examples of resource assignment prioritization within systems that support SPS for eMTC in accordance with various aspects of the present disclosure.
Figure 4B:
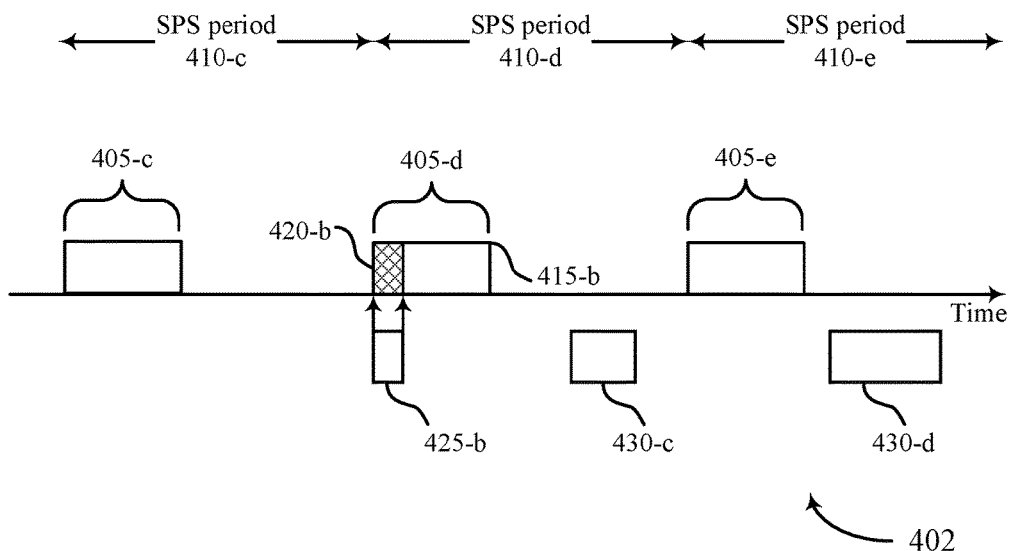
Figure 4C:
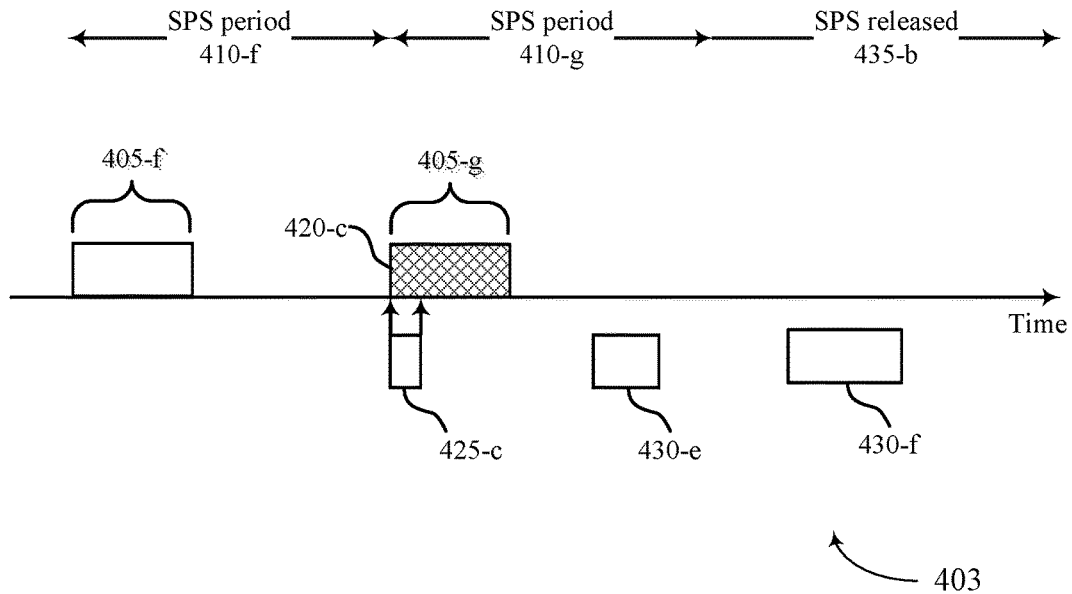
Figure 4D:
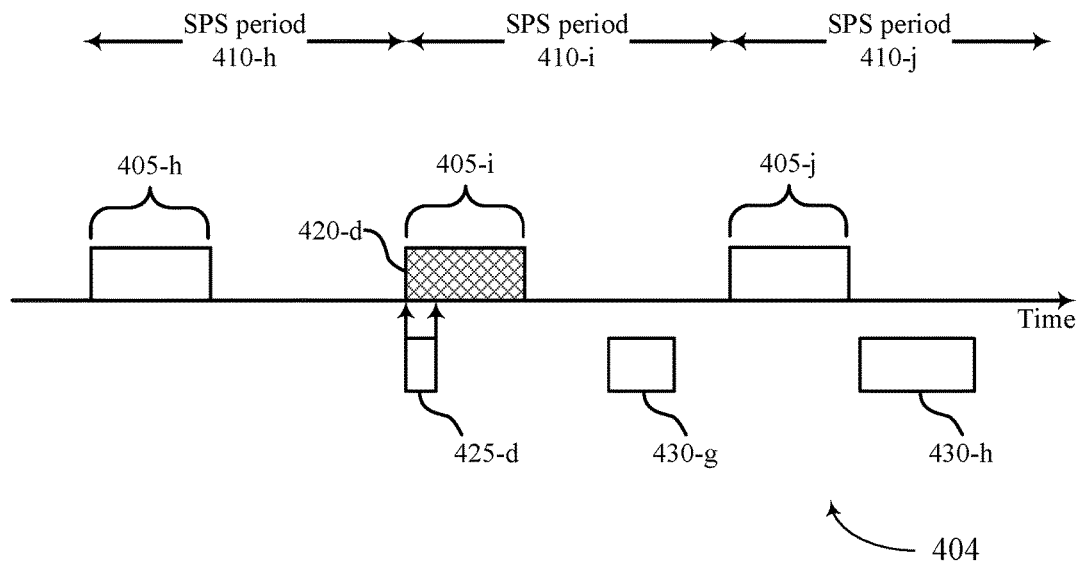

FIGS. 3A and 3B illustrate examples of SPS configuration and activation schemes 301 and 302 within systems that supports SPS for eMTC in accordance with various aspects of the present disclosure. SPS configuration and activation schemes 301 and 302 may be used by a UE 115 and base station 105 as described with reference to FIGS. 1-2. SPS configuration and activation scheme 301 may represent an example in which CE level information (e.g., TTI bundling, power boosting, beamforming, etc.) is included in SPS activation grant 305. SPS configuration and activation schemes 302 may represent an example in which the CE level information (e.g., TTI bundling, power boosting, beamforming, etc.) is included in SPS configuration message 320.

An SPS activation grant 305 may be sent in order to initiate SPS communication by assigning uplink or downlink resources at a periodic interval (e.g., after the SPS has already been configured by higher layers). The SPS activation grant 305 may be sent from a base station 105 to a UE 115. In some cases, the SPS activation grant 305 may include repetition information for SPS assignments and may be sent on PDCCH. The repetition information for SPS assignments may include a duration, a periodicity, and a number of iterations of SPS transmission.

SPS periods 310-a, 310-b, 310-c, and 310-d may be reoccurring timeframes for SPS transmission. That is, SPS periods 310-a, 310-b, 310-c, and 310-d may be an allotted amount of time transmit SPS information for either a UE in uplink communication or a base station in downlink communication to. The SPS periods 310 may have a longer duration than the time reserved for each SPS transmission bundle 315. Bundling information for SPS period 310-a and SPS period 310-b may be determined partially on information from the SPS activation grant 305.

SPS transmission bundle 315-a and SPS transmission bundle 315-b may be sent within SPS periods 310-a and 310-b respectively. SPS transmission bundle 315-a may include repeated information to support coverage enhancement. By sending the same information multiple times, the receiver may obtain the information at a higher signal strength than by transmitting the information once. SPS transmission bundle 315-b may also include a bundle of repeated information, although it may be different repeated information than what is contained in SPS transmission bundle 315-a. The SPS transmission may involve sending SPS transmission bundles 315-a and 315-b for a previously indicated number of iterations as specified in the SPS activation grant 305. After sending SPS transmission bundles 315 for the predetermined number of iterations, the SPS communication may be reconfigured for subsequent SPS transmissions.

Repetition information may alternatively be configured and sent in higher layer signaling, such as part of a SPS configuration message 320, which may sent in RRC signaling. That is, bundling information for SPS period 310-c and SPS period 310-d may be determined partially on information from SPS configuration message 320. Then, an SPS activation 325 may be sent to initialize SPS communication. After initializing communication, SPS transmission bundles 315-c and 315-d may be sent in SPS periods 310-c and 310-d respectively. The SPS communication may involve sending SPS transmission bundle s 315 for a previously indicated number of iterations as specified in the SPS configuration message 320.

FIGS. 4A, 4B, 4C, and 4D illustrate of resource assignment prioritization schemes 401, 402, 403, and 404 within systems that support SPS for eMTC in accordance with various aspects of the present disclosure. Prioritization schemes 401, 402, 403, and 403 may be used by a UE 115 and base station 105 as described with reference to FIGS. 1-2.

SPS transmission bundle 405-a may be sent within SPS period 410-a. The duration of an SPS transmission bundle may be shorter than the duration of its respective SPS period. The duration of SPS transmission bundle 405-a may thus be shorter than the duration of SPS period 410-a. A transmission such as SPS transmission bundle 405-a, may, in some cases, be uninterrupted by dynamic transmissions, and the entire transmission bundle may be received. This may indicate that there is no overlap between a dynamic assignment and SPS transmission bundle 405-a.

In some cases, an SPS transmission such as SPS transmission bundle 405-b may overlap with a dynamic transmission, such as overlapping dynamic transmission 425-a. A UE 115 may determine that SPS-assigned resources and dynamically assigned resources overlap in time upon receiving a grant for the dynamically assigned resources. Dynamically assigned resources, as described herein, may include resources of a physical shared channel assigned to a specific UE 115 with a downlink grant in a downlink control channel. In the case of overlapping bundles of SPS-assigned resources and dynamically assigned resources, the receiver may handle the overlapping SPS communication in one of several ways.

By way of example, in prioritization scheme 401, SPS transmission bundle 405-b may include two portions, such as uninterrupted portion 415-a and interrupted portion 420-a. Uninterrupted portion 415-a may contain a portion of an SPS transmission bundle 405 (e.g., SPS-assigned resources) that does not overlap with a dynamic transmission 425. Interrupted portion 420-a may be scheduled to be received, for example, at the same time as overlapping dynamic transmission 425-a. The device may receive uninterrupted portion 415-a but cease SPS communication. Because the SPS transmission may contain bundled, repeated information, part of uninterrupted portion 415-a may still be useful. After interrupted SPS period 410-b, the time period of SPS released 435-a may last indefinitely or until the SPS communication is reconfigured and re-activated. The receiver may continue to receive dynamic transmissions 430-a and 430-b during the time period of SPS released 435-a.

In prioritization scheme 402, a device may receive SPS transmission bundle 405-c during SPS period 410-c. SPS transmission bundle 405-c may not contain an uninterrupted portion. SPS transmission bundle 405-d may overlap a dynamic transmission, for example overlapping dynamic transmission 425-*b*, and may contain two discrete parts, such as uninterrupted portion 415-*b* and interrupted portion 420-*b*. Uninterrupted portion 415-*b* may contain a portion of an SPS transmission bundle 405 that does not overlap with a dynamic transmission 425. Interrupted portion 420-*b* may be scheduled to be received, for example, at the same time as overlapping dynamic transmission 425-*b*. The device may receive uninterrupted portion 415-*b* and continue further SPS transmissions.

Because the SPS transmission may contain bundled, repeated information, part of uninterrupted portion 415-*b* may still be useful. After interrupted SPS period 410-*d*, SPS communication may continue for the previously configured number of transmission iterations. During SPS period 410-*e*, the receiving device may continue to receive SPS transmission bundle 405-*e*. The receiver may also continue to receive dynamic transmissions 430-*c* and 430-*d*.

In the example illustrated by prioritization scheme 403, a device may receive SPS transmission bundle 405-*f* during SPS period 410-*f* SPS transmission bundle 405-*f* may not contain any uninterrupted portion. SPS transmission bundle 405-*g* may overlap a dynamic transmission, for example dynamic transmission 425-*c*. The receiver may choose to treat all of SPS transmission bundle 405-*g* as an interrupted portion 420-*c* and ignore the entire bundle. Upon having a transmission bundle interrupted, the receiver may choose to cease SPS communication. After interrupted SPS period 410-*g*, the time period of SPS released 435-*b* may last indefinitely, until the SPS communication is reconfigured and re-activated. The receiver may continue to receive dynamic transmissions 430-*e* and 430-*f* during the time period of SPS released 435-*b*.

In the example of prioritization scheme 404, a device may receive SPS transmission bundle 405-*h*. SPS transmission bundle 405-*h* may not contain any uninterrupted portion. SPS transmission bundle 405-*i* may overlap a dynamic transmission, for example dynamic transmission 425-*d*. The receiver may choose to treat all of SPS transmission bundle 405-*i* as an interrupted portion 420-*d* and ignore the entire bundle. The receiver may choose to continue SPS communication despite having a transmission interrupted. After interrupted SPS period 410-*i*, SPS communication may continue for the previously configured number of iterations. During SPS period 410-*j*, the receiving device may receive more SPS transmission bundle 405-*j*, as well as dynamic transmissions 430-*g* and 430-*h*.

Figure 5:
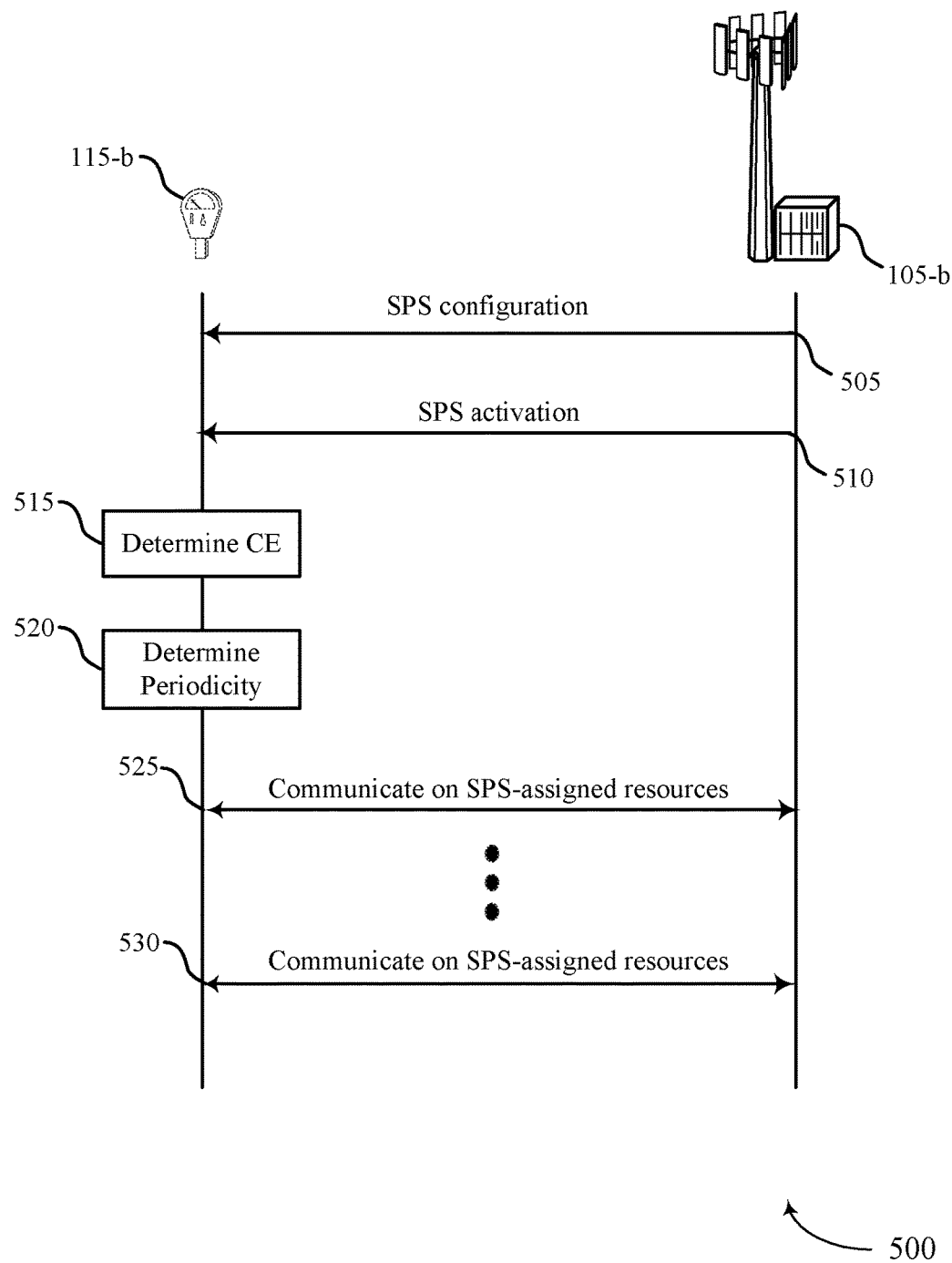
FIG. 5 illustrates an example of a process flow in a system that supports SPS for eMTC in accordance with various aspects of the present disclosure.

FIG. 5 illustrates an example of a Process flow 500 that supports SPS for eMTC in accordance with various aspects of the present disclosure. Process flow 500 may include a UE 115-*b* and base station 105-*b*, which may be examples of a UE 115 and base station 105 described with reference to FIGS. 1 and 2.

At step 505, UE 115-*b* may receive signaling that indicates SPS configuration information. In some cases, the configuration signal may contain CE configuration information including bundling information. At step 510, UE 115-*b* may receive a downlink control message that activates the SPS. In some cases, the activation message may include bundling information. The activation message may be sent on PDCCH for example.

At step 515, UE 115-*b* may determine a coverage enhancement level for resources assigned by the SPS based on the configuration or the downlink control message. That is, in some examples, a CE level may be determined by SPS configuration information received in RRC signaling. In other cases, a CE level may be determined by information, such as an SPS activation, received in a downlink control message. Determining the coverage enhancement level may include selecting a CE level from a set of CE levels, which include a CE level that corresponds to no coverage enhancements. The CE levels may thus include 0 dB, 5 dB, 10 dB, or 15 dB gain, for example.

At step 525, UE 115-*b* may determine a periodicity of the resources assigned by the SPS based on the coverage enhancement level. In some examples, the configuration for the SPS includes multiple SPS periodicities. Determining the periodicity of the resources assigned by the SPS may include selecting the periodicity from the set of SPS periodicities based on the coverage enhancement level.

In some cases, base station 105-*b* may identify a set of periodicities for each of multiple coverage enhancement levels, and may select a periodicity from each set of periodicities. The selected periodicities may be conveyed to UE 115-*b* via RRC signaling.

UE 115-*b* may communicate with a base station on the resources assigned by the SPS according to the coverage enhancement level. Both UE 115-*b* and the base station 105-*b* may transmit on SPS-assigned resources.

At step 525, either UE 115-*b* or base station 105-*b* may transmit or receive on SPS-assigned resources. The resource may include TTI-bundled resources. In accordance with SPS configuration, during a subsequent transmission period, the UE 115-*b* or the base station 105-*b* may transmit or receive on SPS-assigned resources at step 530. Transmission and reception on SPS-assigned resources may continue according to the SPS configuration and SPS activation or until SPS is released. An SPS release may be due, e.g., to several unused uplink transmission periods or to overlapping scheduled transmissions.

By way of example, UE 115-*b* may determine that an uplink data buffer is empty during a transmission period of the configuration, where the configuration includes an uplink SPS configuration. The UE 115-*b* may refrain from transmitting on the resources assigned by the SPS during the transmission based on the determination that the uplink data buffer is empty. Then, the UE 115-*b* may increment a counter based on the refraining from transmitting on the resources. The UE 115-*b* may determine that the counter has value that exceeds a threshold and may release the SPS based on the determination that the counter exceeds the threshold.

In some cases, the UE 115-*b* may be configured to refrain from transmitting during a transmission period on resources assigned by the SPS. For example, signaling from the base station 105-*b* may include an indication that the UE 115-*b* is to refrain from transmitting during a transmission period when an uplink data buffer of the UE 115-*b* is empty. Such an indication may be included in the signaling that indicates the SPS configuration or in a downlink control message. The UE 115-*b* may receive the indication from base station 105-*b* to determine whether the uplink data buffer is empty during the transmission period of the SPS configuration. The UE 115-*b* may refrain from transmitting based on determining that the uplink data buffer is empty, and thus based on receiving the indication.

In some cases, UE 115-*b* may receive a second downlink control message that includes a dynamic assignment of resources. The UE 115-*b* may determine that the resources assigned by the dynamic assignment overlap with the resources assigned by the SPS.

In some cases, UE 115-*b* may communicate based on the dynamic assignment. The UE 115-*b* may refrain from communicating some or all of the resources assigned by the SPS based on the determination that the resources assigned by the dynamic assignment overlap with the resources assigned by the SPS. In some examples, the resources assigned by the SPS include bundled TTIs. In some examples, refraining from communicating includes refraining from communicating for one bundle of TTIs. The UE 115-*b* may release the SPS based on determining that the additional resources overlap with the resources assigned by the SPS.

In some examples, UE 115-*b* may refrain from communicating on the resources assigned by the dynamic assignment based on determining that the additional resources overlap with the resources assigned by the SPS. Refraining from communicating may, for instance, be based on whether the SPS configuration includes an uplink configuration or a downlink configuration. The UE 115-*b* may determine that resources assigned by the SPS include overlapping uplink resources and downlink resources. Communicating with the base station 105-*b* may thus include refraining from communicating on a portion of the uplink resources or the downlink resources.

In some cases, UE 115-*b* may prioritize the uplink resources or the downlink resources for communication when both SPS-assigned uplink and downlink resources overlap. Thus, communicating with the base station 105-*b* may include communicating based on the prioritization of the uplink or downlink SPS-assigned resources.

Figure 6:
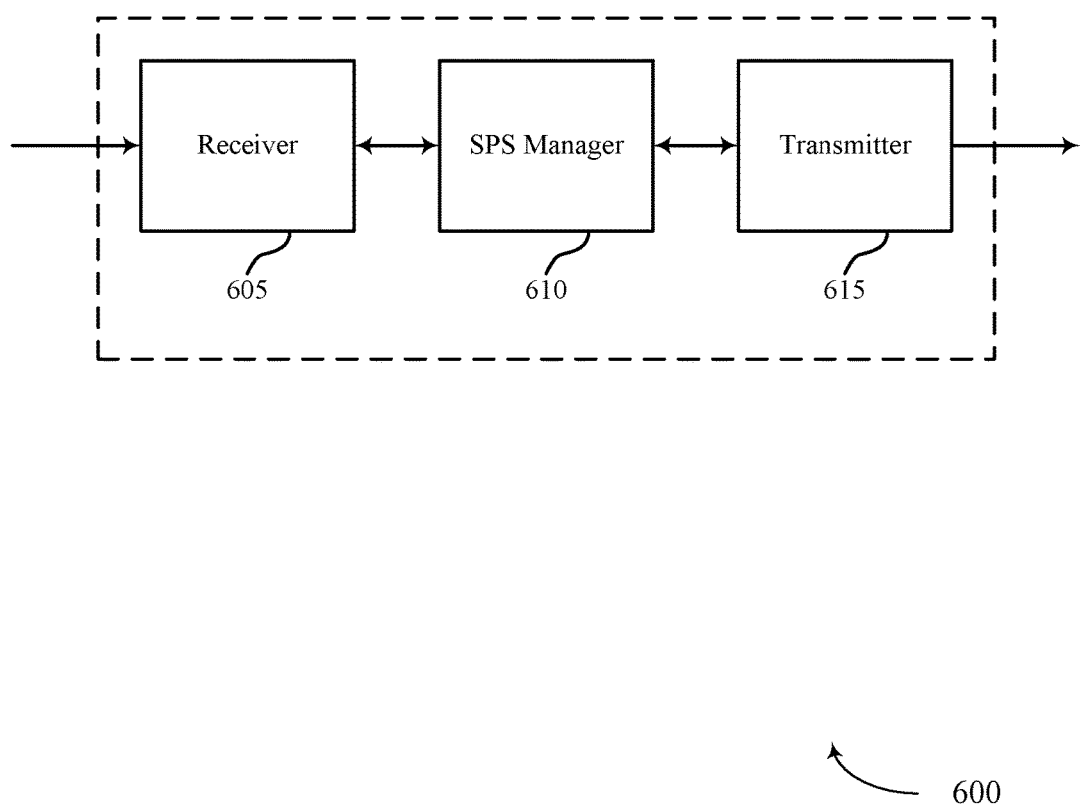
FIGS. 6-8 show block diagrams of a wireless device or devices that support SPS for eMTC in accordance with various aspects of the present disclosure.

FIG. 6 shows a block diagram of a wireless device 600 that supports SPS for eMTC in accordance with various aspects of the present disclosure. Wireless device 600 may be an example of aspects of a UE 115 described with reference to FIGS. 1-5. Wireless device 600 may include a receiver 605, a SPS manager 610, or a transmitter 615. Wireless device 600 may also include a processor. Each of these components may be in communication with one another.

The receiver 605 may receive information such as packets, user data, or control information associated with various information channels (e.g., control channels, data channels, and information related to SPS for eMTC, etc.). Information may be passed on to the SPS manager 610, and to other components of wireless device 600.

The SPS manager 610 may, in combination with receiver 605, receive signaling that indicates a configuration for an SPS, receive a downlink control message that activates the SPS, determine a coverage enhancement level for resources assigned by the SPS based on the configuration or the downlink control message, and communicate with a base station on the resources assigned by the SPS according to the coverage enhancement level.

The transmitter 615 may transmit signals received from other components of wireless device 600. In some examples, the transmitter 615 may be collocated with the receiver 605 in a transceiver module. The transmitter 615 may include a single antenna, or it may include a plurality of antennas.

Figure 7:
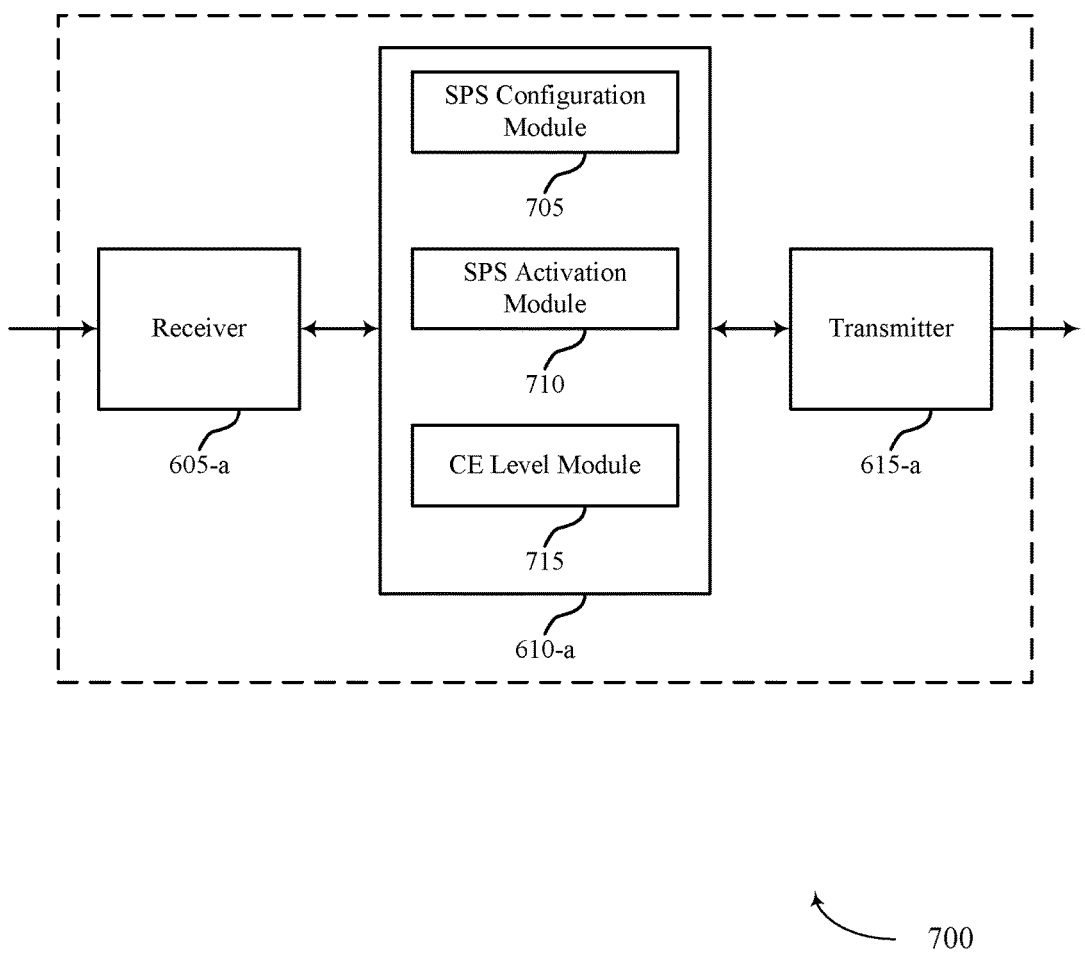

FIG. 7 shows a block diagram of a wireless device 700 that supports SPS for eMTC in accordance with various aspects of the present disclosure. Wireless device 700 may be an example of aspects of a wireless device 600 or a UE 115 described with reference to FIGS. 1-6. Wireless device 700 may include a receiver 605-*a*, a SPS manager 610-*a*, or a transmitter 615-*a*. Wireless device 700 may also include a processor. Each of these components may be in communication with one another. The SPS manager 610-*a* may also include a SPS configuration module 705, a SPS activation module 710, and a CE level module 715.

The receiver 605-*a* may receive information which may be passed on to SPS manager 610-*a*, and to other components of wireless device 700. The SPS manager 610-*a* may perform the operations described with reference to FIG. 6. The transmitter 615-*a* may transmit signals received from other components of wireless device 700.

The SPS configuration module 705 may, in combination with a receiver 605-*a*, receive signaling that indicates a configuration for an SPS as described with reference to FIGS. 2-5. In some examples, the configuration for the SPS includes multiple SPS periodicities. In some cases, the signaling that indicates the configuration for an SPS may include an indication for the wireless device 700 to determine whether an uplink data buffer is empty during a transmission period of the SPS configuration. The wireless device 700 may determine whether the buffer is empty during a time period, and may thus refrain from transmitting based on the determination and thus based on the indication. The SPS configuration module 705 may also determine that an uplink data buffer is empty during a transmission period of the configuration. The SPS configuration module 705 may cause device 700 to refrain from transmitting on the resources assigned by the SPS during the transmission based on the determination that the uplink data buffer is empty. The SPS configuration module 705 may also increment a counter based on the refraining from transmitting on the resources.

The SPS configuration module 705 may determine that the counter has value that exceeds a threshold. In some examples, the refraining from communicating may be based on whether the SPS configuration is determined to be an UL configuration or a DL configuration. In some examples, the configuration includes an uplink SPS configuration and a downlink SPS configuration. The SPS configuration module 705 may also determine that resources assigned by the SPS include overlapping uplink resources and downlink resources. In some examples, communicating with the base station includes refraining from communicating on at least a portion of the uplink resources or the downlink resources. The SPS configuration module 705 may prioritize the uplink resources or the downlink resources for communication. In some examples, the device 700 may communicate with a base station based on the prioritization. The SPS configuration module 705 may, in some cases, select a periodicity from each set of periodicities, where the configuration for the SPS includes the periodicity from each set.

The SPS activation module 710 may, in combination with receiver 650-*a*, receive a downlink control message that activates the SPS as described with reference to FIGS. 2-5. The SPS activation module 710 may also release the SPS based on a determination that the counter discussed above exceeds the threshold. The SPS activation module 710 may also release the SPS based on, for example, determining that the additional resources overlap with the resources assigned by the SPS.

The CE level module 715 may determine a coverage enhancement level for resources assigned by the SPS based on the configuration or the downlink control message as described with reference to FIGS. 2-5. The CE level module 715 also, in combination with the receiver 605-*a* or transmitter 615-*a*, communicate with a base station on the resources assigned by the SPS according to the coverage enhancement level. The CE level module 715 may also determine a periodicity of the resources assigned by the SPS based on the coverage enhancement level. In some examples, determining the periodicity of the resources assigned by the SPS includes selecting the periodicity from the set of SPS periodicities based on the coverage enhancement level. In some examples, determining the coverage enhancement level includes selecting a coverage enhancement level from a set of coverage enhancement levels, where the set includes a level that corresponds to no coverage enhancements. The CE level module 715 may also identify a set of periodicities for each of multiple coverage enhancement levels.

Figure 8:
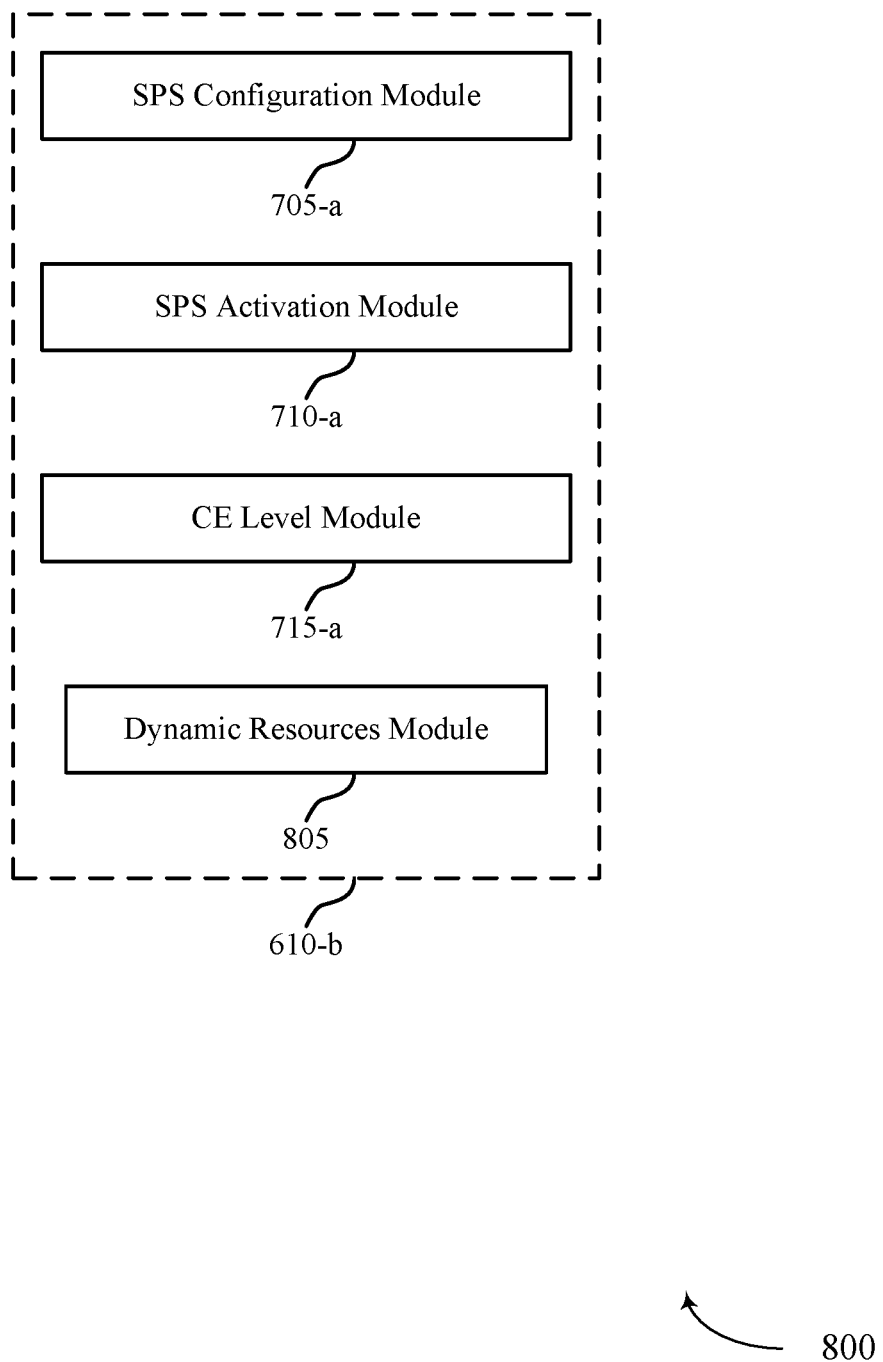

FIG. 8 shows a block diagram 800 of a SPS manager 610-*b* which may be a component of a wireless device 600 or a wireless device 700 that supports SPS for eMTC in accordance with various aspects of the present disclosure. The SPS manager 610-*b* may be an example of aspects of a SPS manager 610 described with reference to FIGS. 6-7. The SPS manager 610-*b* may include a SPS configuration module 705-*a*, a SPS activation module 710-*a*, and a CE level module 715-*a*. Each of these modules may perform the functions described with reference to FIG. 7. The SPS manager 610-*b* may also include and a dynamic resources module 805.

The dynamic resources module 805 may receive a second downlink control message that includes a dynamic assignment of resources as described with reference to FIGS. 2-5. The dynamic resources module 805 may also determine that the resources assigned by the dynamic assignment overlap with the resources assigned by the SPS. The dynamic resources module 805 may also communicate based on the dynamic assignment. The dynamic resources module 805 may also refrain from communicating on at least a portion of the resources assigned by the SPS based on the determination that the resources assigned by the dynamic assignment overlap with the resources assigned by the SPS.

In some examples, the resources assigned by the SPS include bundled TTIs. Refraining from communicating may thus include refraining from communicating for at least one bundle of TTIs. The dynamic resources module 805 may cause a device 600 or 700 to refrain from communicating on the resources assigned by the dynamic assignment based on determining that the additional resources overlap with the resources assigned by the SPS. In some examples, communicating with the UE includes communicating based on the dynamic assignment of resources.

Figure 9:
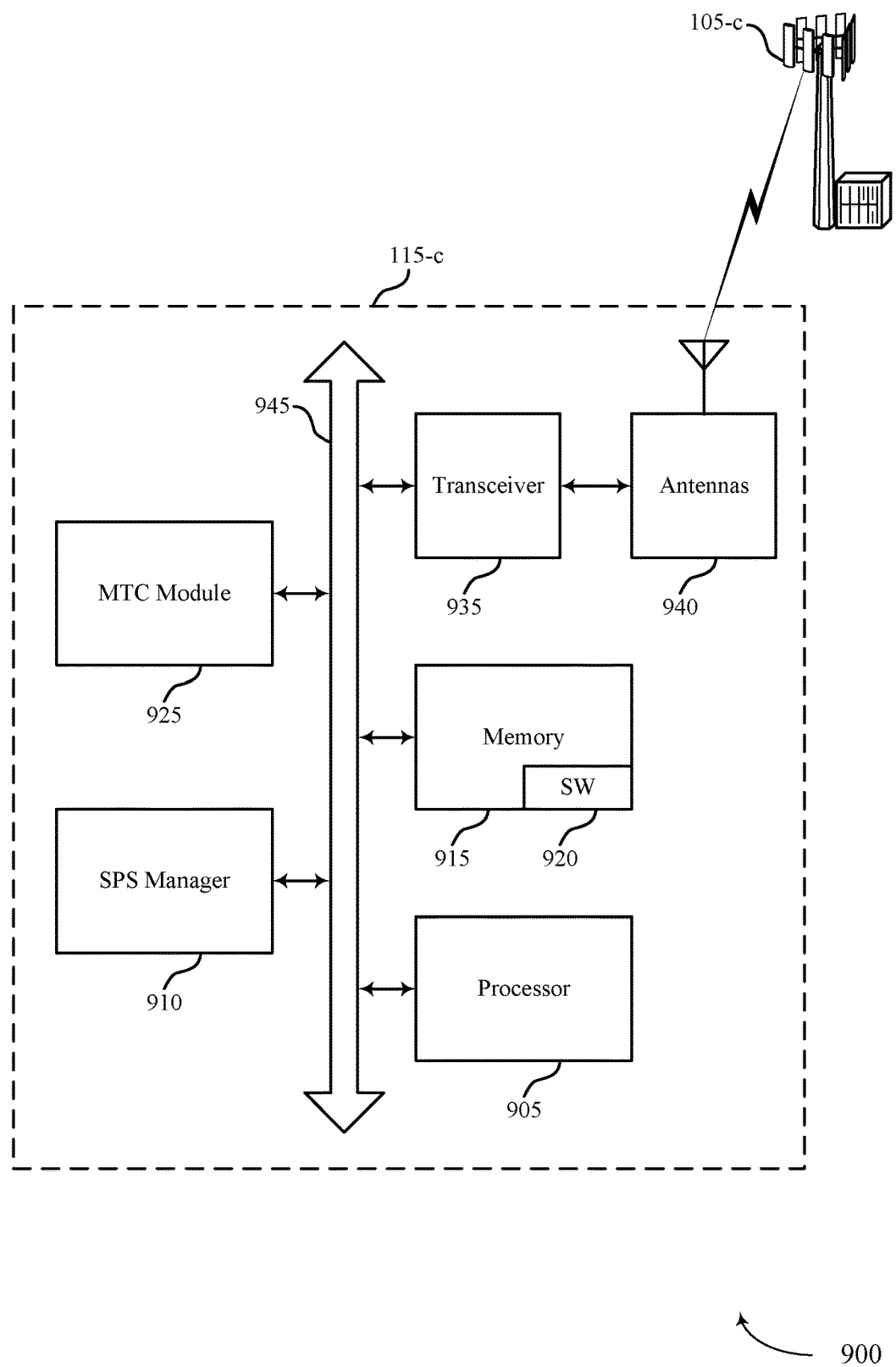
FIG. 9 illustrates an example of a system, including a user equipment (UE), that supports SPS for eMTC in accordance with various aspects of the present disclosure.

FIG. 9 shows a diagram of a system 900, including a UE that supports SPS for eMTC in accordance with various aspects of the present disclosure. System 900 may include UE 115-*c*, which may be an example of a wireless device 600, a wireless device 700, or a UE 115 described with reference to FIGS. 1, 2 and 6-8. UE 115-*c* may include a SPS manager 910, which may be an example of a SPS manager 610 described with reference to FIGS. 6-8. UE 115-*c* may also include an MTC 925, which may enable MTC operations such as communication with CE. UE 115-*c* may also include components for bi-directional voice and data communications including components for transmitting communications and components for receiving communications. For example, UE 115-*c* may communicate bi-directionally with base station 105-*c*.

UE 115-*c* may also include a processor 905, and memory 915 (including software (SW) 920), a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks, as described above. For example, the transceiver 935 may communicate bi-directionally with a base station 105 or another UE 115. The transceiver 935 may include a modem to modulate the packets and provide the modulated packets to the antenna(s) 940 for transmission, and to demodulate packets received from the antenna(s) 940. While UE 115-*c* may include a single antenna 940, UE 115-*c* may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor 905 to perform various functions described herein (e.g., SPS for eMTC, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an application specific integrated circuit (ASIC), etc.)

Figure 10:
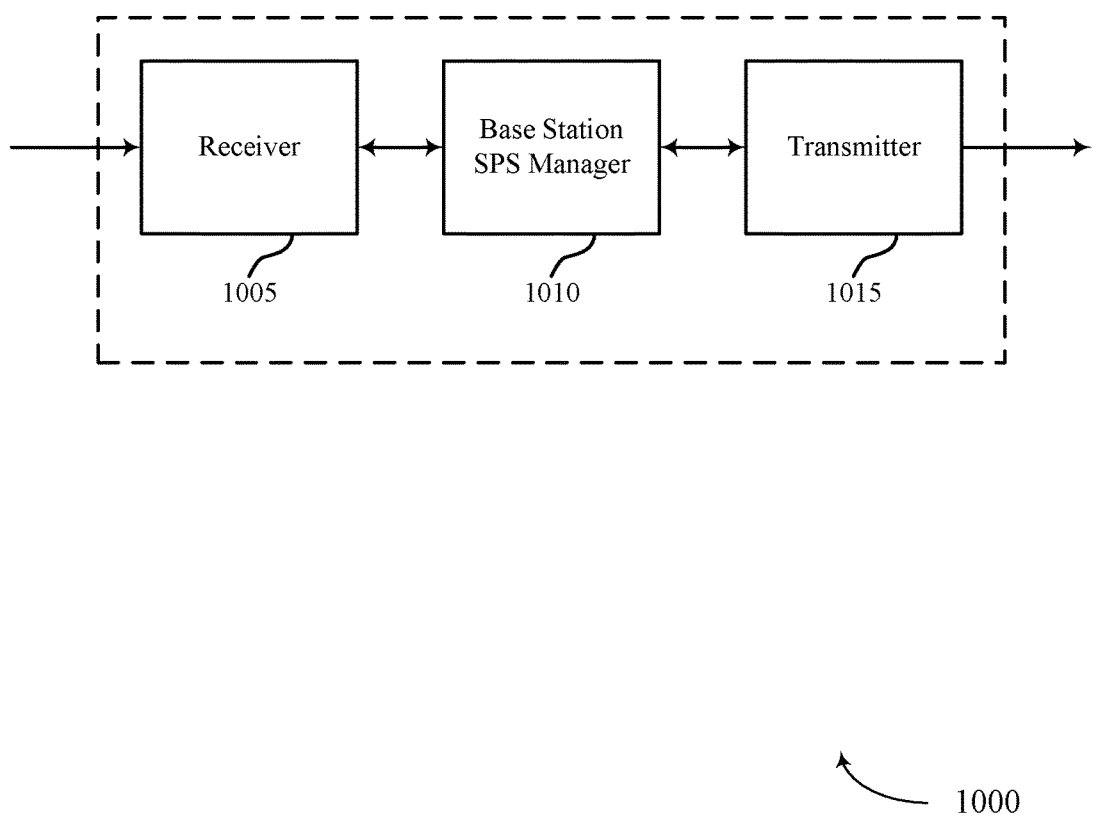
FIGS. 10-12 show block diagrams of a wireless device or devices that support SPS for eMTC in accordance with various aspects of the present disclosure.

FIG. 10 shows a block diagram of a wireless device 1000 that supports SPS for eMTC in accordance with various aspects of the present disclosure. Wireless device 1000 may be an example of aspects of a base station 105 described with reference to FIGS. 1-9. Wireless device 1000 may include a receiver 1005, a base station SPS manager 1010, or a transmitter 1015. Wireless device 1000 may also include a processor. Each of these components may be in communication with one another.

The receiver 1005 may, in combination with receiver 1005 for example, receive information such as packets, user data, or control information associated with various information channels (e.g., control channels, data channels, and information related to SPS for eMTC, etc.). Information may be passed on to the base station SPS manager 1010, and to other components of wireless device 1000.

The base station SPS manager 1010 may transmit signaling that indicates a configuration for an SPS, transmit a downlink control message that activates the SPS, where the configuration or the downlink control message indicates a coverage enhancement level, and communicate with a UE on resources assigned by the SPS according to the coverage enhancement level.

The transmitter 1015 may transmit signals received from other components of wireless device 1000. In some examples, the transmitter 1015 may be collocated with the receiver 1005 in a transceiver module. The transmitter 1015 may include a single antenna, or it may include multiple antennas.

Figure 11:
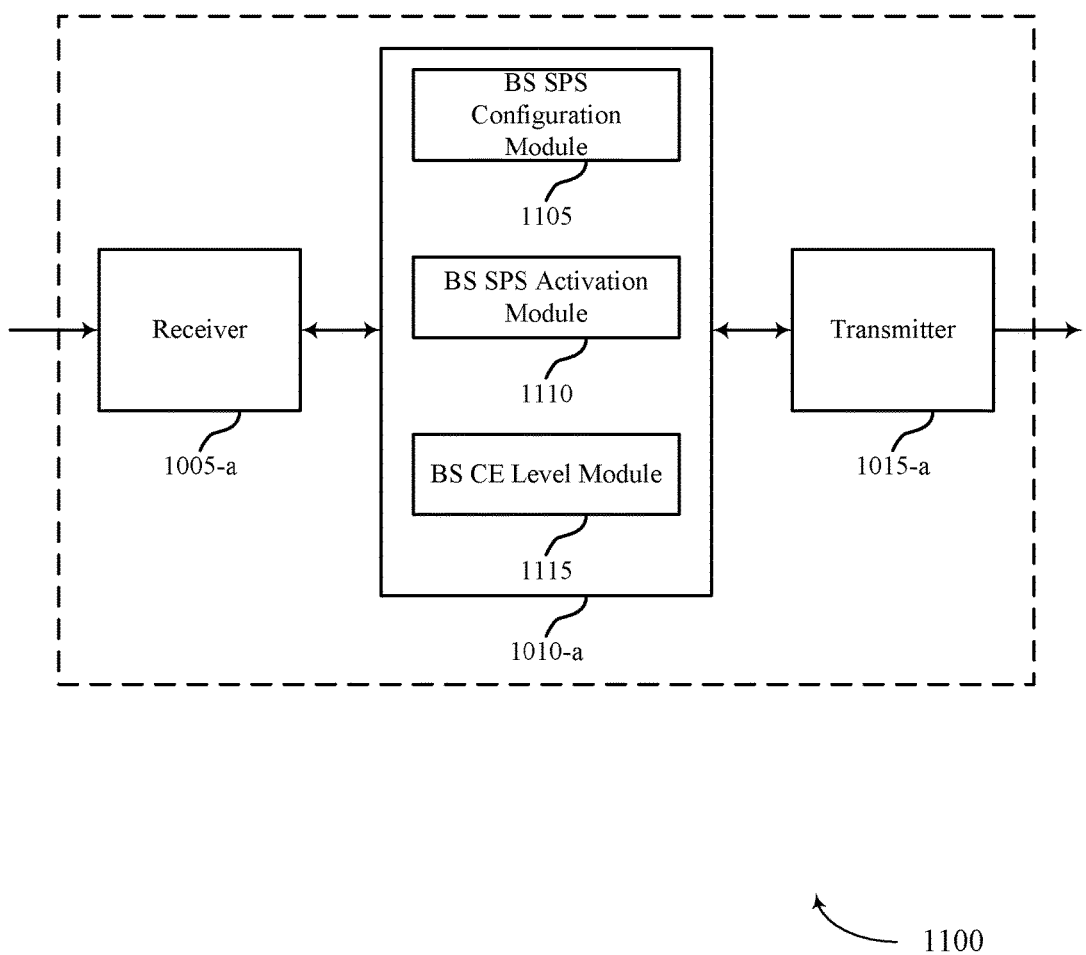

FIG. 11 shows a block diagram of a wireless device 1100 that supports SPS for eMTC in accordance with various aspects of the present disclosure. Wireless device 1100 may be an example of aspects of a wireless device 1000 or a base station 105 described with reference to FIGS. 1-10. Wireless device 1100 may include a receiver 1005-*a*, a base station SPS manager 1010-*a*, or a transmitter 1015-*a*. Wireless device 1100 may also include a processor. Each of these components may be in communication with one another. The base station SPS manager 1010-*a* may also include a BS SPS configuration module 1105, a BS SPS activation module 1110, and a BS CE level module 1115.

The receiver 1005-*a* may receive information, which may be passed on to base station SPS manager 1010-*a*, and to other components of wireless device 1100. The base station SPS manager 1010-*a* may perform the operations described with reference to FIG. 10. The transmitter 1015-*a* may transmit signals received from other components of wireless device 1100.

The BS SPS configuration module 1105 may, in combination with transmitter 1015-*a* for example, transmit signaling that indicates a configuration for an SPS as described with reference to FIGS. 2-5. The BS SPS activation module 1110 may, in combination with transmitter 1015-*a* for example, transmit a downlink control message that activates the SPS, where the configuration or the downlink control message indicates a coverage enhancement level as described with reference to FIGS. 2-5. The BS SPS configuration module 1105 or the BS SPS activation module 1110 may, in combination with transmitter 1015-*a*, for example, transmit an indication for a UE to refrain from transmitting during a transmission period of an SPS configuration when an uplink data buffer of the UE is empty. The BS CE level module 1115 may, in combination with receiver 1005-*a* or transmitter 1015-*a* for example, communicate with a UE on resources assigned by the SPS according to the coverage enhancement level as described with reference to FIGS. 2-5.

Figure 12:
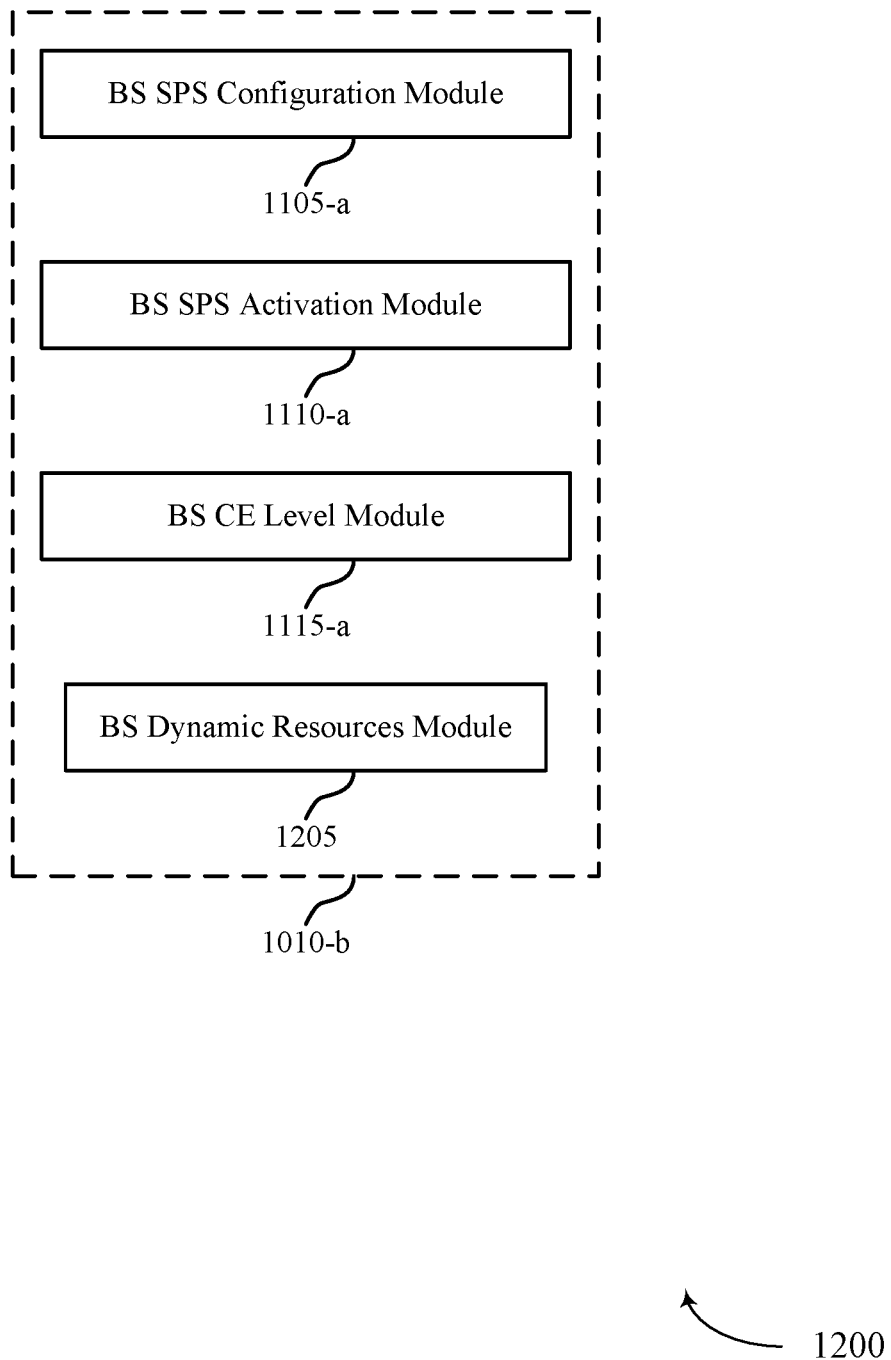

FIG. 12 shows a block diagram 1200 of a base station SPS manager 1010-*b* which may be a component of a wireless device 1000 or a wireless device 1100 that supports SPS for eMTC in accordance with various aspects of the present disclosure. The base station SPS manager 1010-*b* may be an example of aspects of a base station SPS manager 1010 described with reference to FIGS. 10-11. The base station SPS manager 1010-*b* may include a BS SPS configuration module 1105-*a*, a BS SPS activation module 1110-*a*, and a BS CE level module 1115-*a*. Each of these modules may perform the functions described with reference to FIG. 11. The base station SPS manager 1010-*b* may also include and a BS dynamic resources module 1205.

The BS dynamic resources module 1205 may, in combination with a transmitter 1015 for example, transmit a second downlink control message that includes a dynamic assignment of resources, where the dynamic assignment overlaps with the resources assigned by the SPS as described with reference to FIGS. 2-5.

Figure 13:
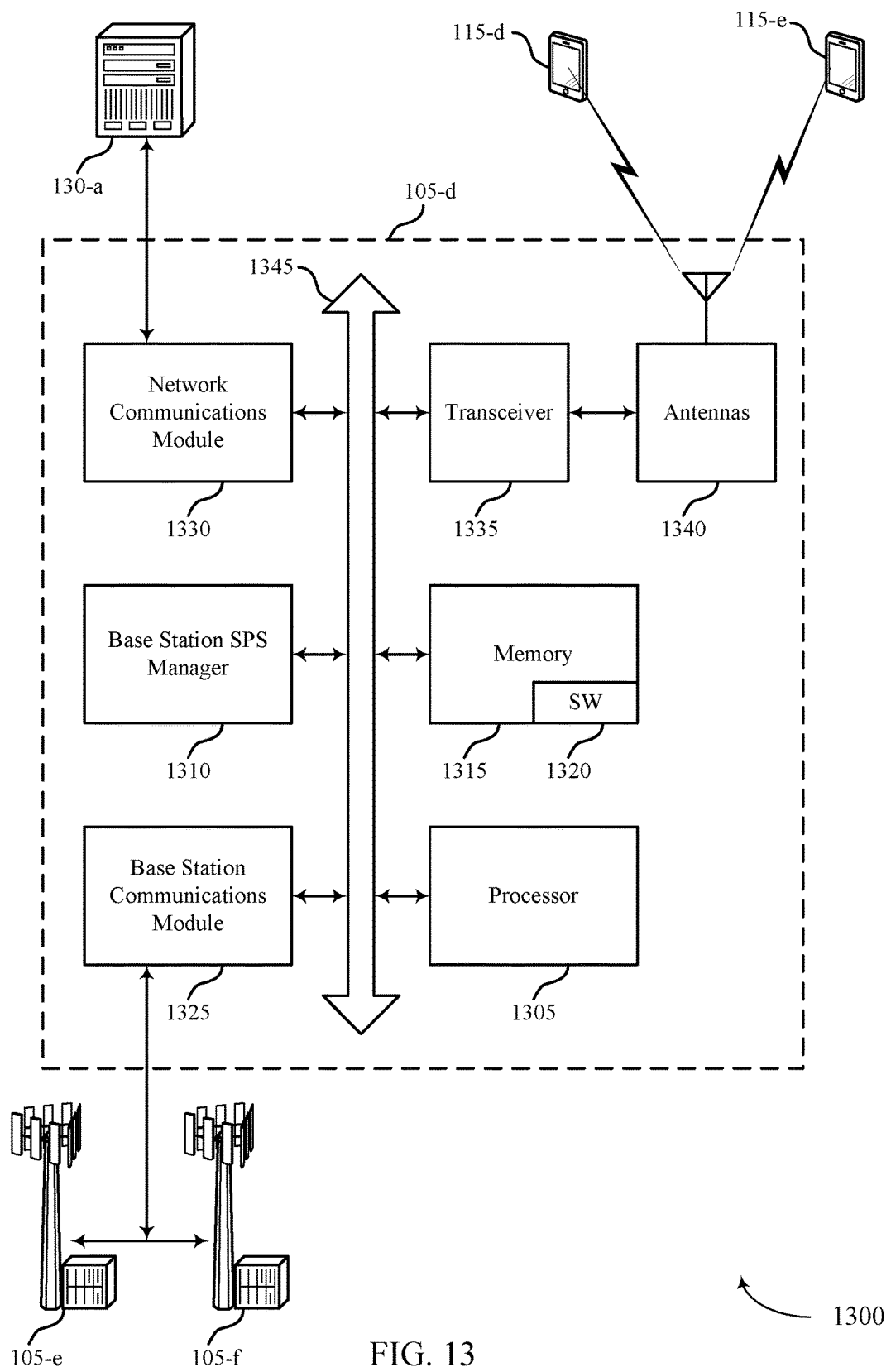
FIG. 13 illustrates an example of a system, including a base station, that supports SPS for eMTC in accordance with various aspects of the present disclosure.

FIG. 13 shows a diagram of a system 1300, including a base station that supports SPS for eMTC in accordance with various aspects of the present disclosure. System 1300 may include base station 105-*d*, which may be an example of a wireless device 1000, a wireless device 1100, or a base station 105 described with reference to FIGS. 1, 2 and 10-12. Base Station 105-*d* may include a base station SPS manager 1310, which may be an example of a base station SPS manager 1010 described with reference to FIGS. 10-12. Base Station 105-*d* may also include components for bi-directional voice and data communications including components for transmitting communications and components for receiving communications. For example, base station 105-*d* may communicate bi-directionally with UE 115-*d* or UE 115-*e*.

In some cases, base station 105-*d* may have one or more wired backhaul links. Base station 105-*d* may have a wired backhaul link (e.g., S1 interface, etc.) to the core network 130. Base station 105-*d* may also communicate with other base stations 105, such as base station 105-*e* and base station 105-*f* via inter-base station backhaul links (e.g., an X2 interface). Each of the base stations 105 may communicate with UEs 115 using the same or different wireless communications technologies. In some cases, base station 105-*d* may communicate with other base stations such as 105-*e* or 105-*f* utilizing base station communications module 1325. In some examples, base station communications module 1325 may provide an X2 interface within an LTE/LTE-A wireless communication network technology to provide communication between some of the base stations 105. In some examples, base station 105-*d* may communicate with other base stations through core network 130. In some cases, base station 105-*d* may communicate with the core network 130 through network communications module 1330.

The base station 105-*d* may include a processor 1305, memory 1315 (including software (SW) 1320), transceiver 1335, and antenna(s) 1340, which each may be in communication, directly or indirectly, with one another (e.g., over bus system 1345). The transceivers 1335 may be configured to communicate bi-directionally, via the antenna(s) 1340, with the UEs 115, which may be multi-mode devices. The transceiver 1335 (or other components of the base station 105-*d*) may also be configured to communicate bi-directionally, via the antennas 1340, with one or more other base stations (not shown). The transceiver 1335 may include a modem configured to modulate the packets and provide the modulated packets to the antennas 1340 for transmission, and to demodulate packets received from the antennas 1340. The base station 105-*d* may include multiple transceivers 1335, each with one or more associated antennas 1340. The transceiver may be an example of a combined receiver 1005 and transmitter 1015 of FIG. 10.

The memory 1315 may include RAM and ROM. The memory 1315 may also store computer-readable, computer-executable software code 1320 containing instructions that are configured to, when executed, cause the processor 1305 to perform various functions described herein (e.g., SPS for eMTC, selecting coverage enhancement techniques, call processing, database management, message routing, etc.). Alternatively, the software code 1320 may not be directly executable by the processor 1305 but be configured to cause the computer, e.g., when compiled and executed, to perform functions described herein. The processor 1305 may include an intelligent hardware device, e.g., a CPU, a microcontroller, an ASIC, etc. The processor 1305 may include various special purpose processors such as encoders, queue processing modules, base band processors, radio head controllers, digital signal processor (DSPs), and the like.

The base station communications module 1325 may manage communications with other base stations 105. In some cases, a communications management module may include a controller or scheduler for controlling communications with UEs 115 in cooperation with other base stations 105. For example, the base station communications module 1325 may coordinate scheduling for transmissions to UEs 115 for various interference mitigation techniques such as beam-forming or joint transmission.

The components of wireless device 600, wireless device 700, SPS manager 610, wireless device 1000, wireless device 1100, BS SPS manager 1010, and systems 900 and 1300 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 14:
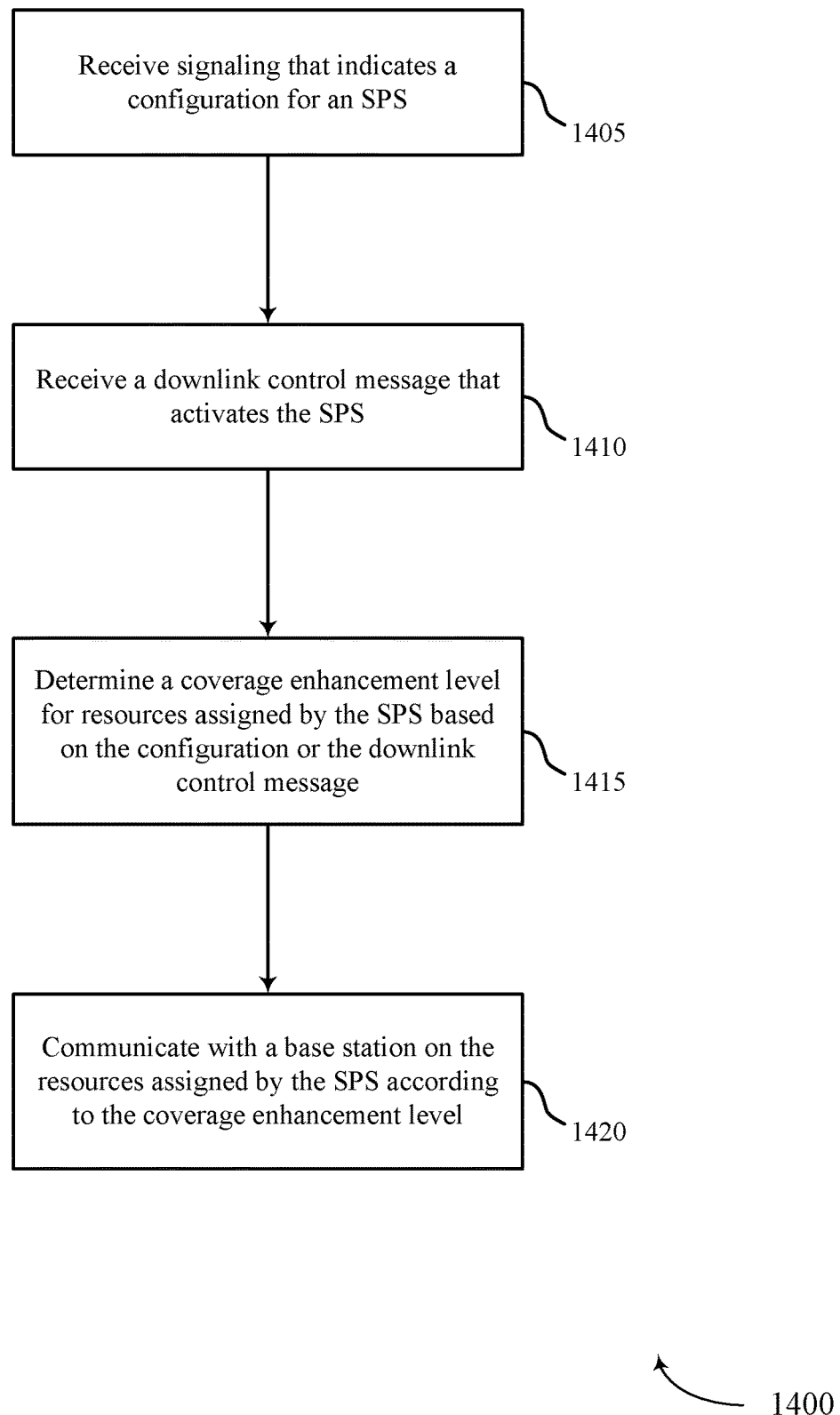
FIGS. 14-17 illustrate methods that support SPS for eMTC in accordance with various aspects of the present disclosure.

FIG. 14 shows a flowchart illustrating a method 1400 that supports SPS for eMTC in accordance with various aspects of the present disclosure. The operations of method 1400 may be implemented by a UE 115 or its components as described with reference to FIGS. 1-13. For example, the various operations of method 1400 may be performed by the SPS manager 610 or 910 and the transceiver 935, as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware.

At block 1405, the UE 115 may receive signaling that indicates a configuration for an SPS as described with reference to FIGS. 2-5. In certain examples, the operations of block 1405 may be performed by the SPS configuration module 705 as described with reference to FIG. 7 or the transceiver 935 as described with reference to FIG. 9.

At block 1410, the UE 115 may receive a downlink control message that activates the SPS as described with reference to FIGS. 2-5. In certain examples, the operations of block 1410 may be performed by the SPS activation module 710 as described with reference to FIG. 7 or the transceiver 935 as described with reference to FIG. 9.

At block 1415, the UE 115 may determine a coverage enhancement level for resources assigned by the SPS based on the configuration or the downlink control message as described with reference to FIGS. 2-5. In certain examples, the operations of block 1415 may be performed by the CE level module 715 as described with reference to FIG. 7 or the SPS manager 910 as described with reference to FIG. 9.

At block 1420, the UE 115 may communicate with a base station on the resources assigned by the SPS according to the coverage enhancement level as described with reference to FIGS. 2-5. In certain examples, the operations of block 1420 may be performed by the CE level module 715 as described with reference to FIG. 7 or the transceiver 935 as described with reference to FIG. 9.

Figure 15:
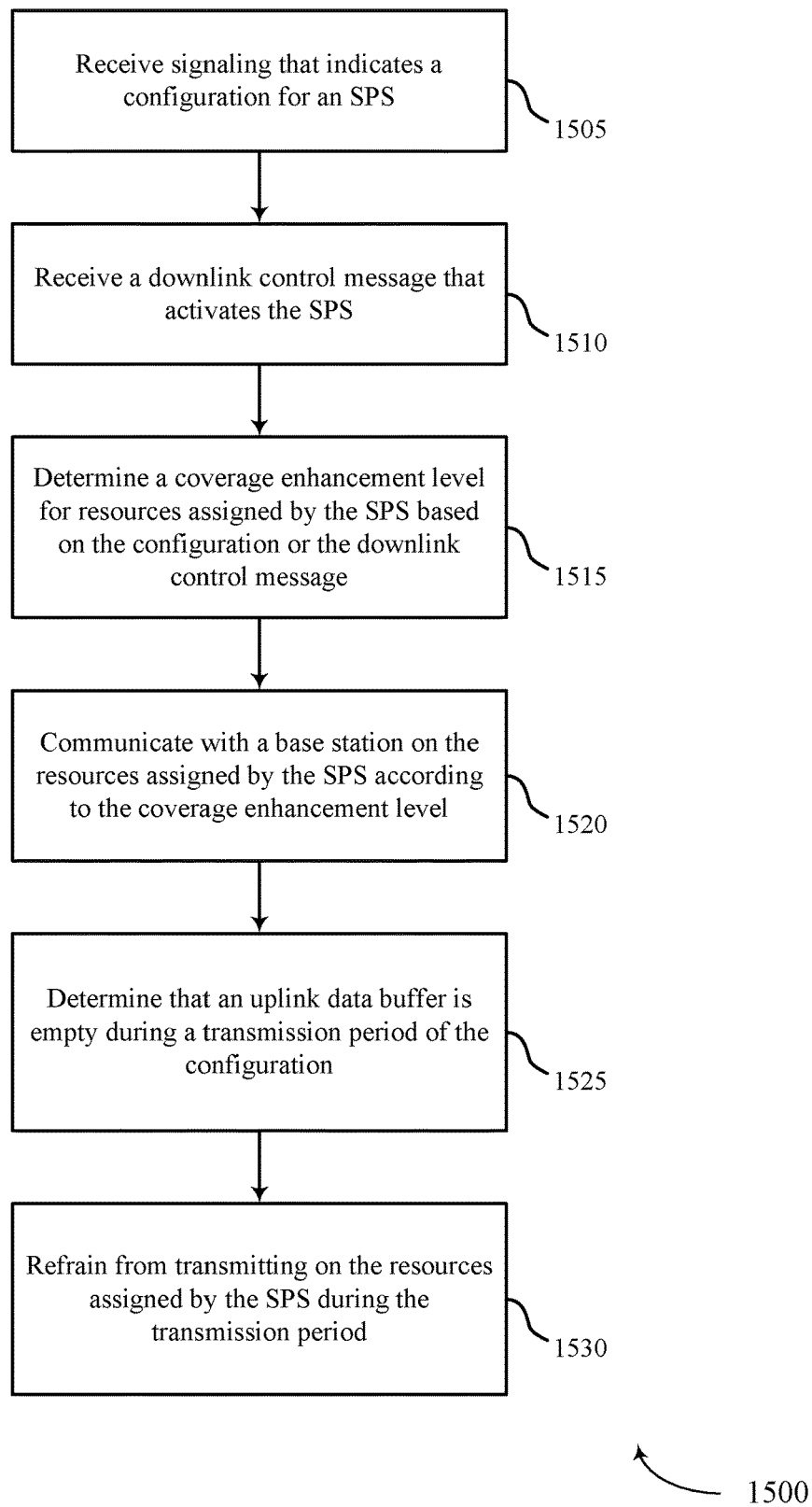

FIG. 15 shows a flowchart illustrating a method 1500 that supports SPS for eMTC in accordance with various aspects of the present disclosure. The operations of method 1500 may be implemented by a UE 115 or its components as described with reference to FIGS. 1-13. For example, the operations of method 1500 may be performed by the SPS manager 610 610 or 910 and the transceiver 935, as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of method 1400 of FIG. 14.

At block 1505, the UE 115 may receive signaling that indicates a configuration for an SPS as described with reference to FIGS. 2-5. In certain examples, the operations of block 1505 may be performed by the SPS configuration module 705 as described with reference to FIG. 7 or the transceiver 935 as described with reference to FIG. 9.

At block 1510, the UE 115 may receive a downlink control message that activates the SPS as described with reference to FIGS. 2-5. In certain examples, the operations of block 1510 may be performed by the SPS activation module 710 as described with reference to FIG. 7 or the transceiver 935 as described with reference to FIG. 9.

At block 1515, the UE 115 may determine a coverage enhancement level for resources assigned by the SPS based on the configuration or the downlink control message as described with reference to FIGS. 2-5. In certain examples, the operations of block 1515 may be performed by the CE level module 715 as described with reference to FIG. 7 or the SPS manager 910 as described with reference to FIG. 9.

At block 1520, the UE 115 may communicate with a base station on the resources assigned by the SPS according to the coverage enhancement level as described with reference to FIGS. 2-5. In certain examples, the operations of block 1520 may be performed by the CE level module 715 as described with reference to FIG. 7 or the transceiver 935 as described with reference to FIG. 9.

At block 1525, the UE 115 may determine that an uplink data buffer is empty during a transmission period of the configuration, where the configuration includes an uplink SPS configuration as described with reference to FIGS. 2-5. In certain examples, the operations of block 1525 may be performed by the SPS configuration module 705 as described with reference to FIG. 7 or the SPS manager 910 as described with reference to FIG. 9.

At block 1530, the UE 115 may refrain from transmitting on the resources assigned by the SPS during the transmission based on the determination that the uplink data buffer is empty as described with reference to FIGS. 2-5. In certain examples, the operations of block 1530 may be performed by the SPS configuration module 705 as described with reference to FIG. 7 or the SPS manager 910 as described with reference to FIG. 9. In some examples, the UE 115 may receive an indication to determine whether the uplink data buffer is empty during the transmission period of the configuration, and the UE 115 may refrain from transmitting based on the indication.

Figure 16:
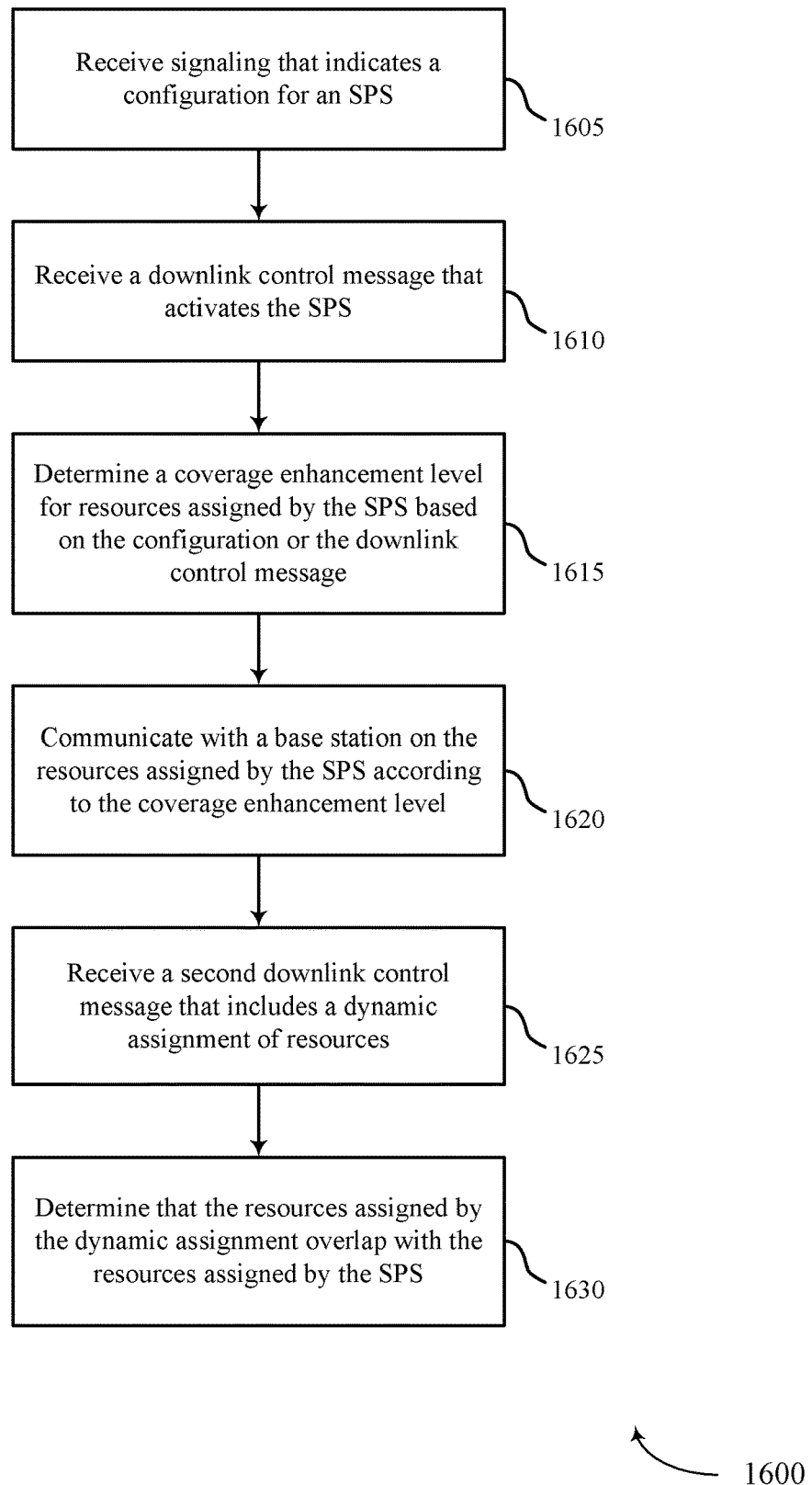

FIG. 16 shows a flowchart illustrating a method 1600 that supports SPS for eMTC in accordance with various aspects of the present disclosure. The operations of method 1600 may be implemented by a UE 115 or its components as described with reference to FIGS. 1-13. For example, the operations of method 1600 may be performed by the SPS manager 610 or 910 and the transceiver 935, as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1400, and 1500 of FIGS. 14-15.

At block 1605, the UE 115 may receive signaling that indicates a configuration for an SPS as described with reference to FIGS. 2-5. In certain examples, the operations of block 1605 may be performed by the SPS configuration module 705 as described with reference to FIG. 7 or the transceiver 935 as described with reference to FIG. 9.

At block 1610, the UE 115 may receive a downlink control message that activates the SPS as described with reference to FIGS. 2-5. In certain examples, the operations of block 1610 may be performed by the SPS activation module 710 as described with reference to FIG. 7 or the transceiver 935 as described with reference to FIG. 9.

At block 1615, the UE 115 may determine a coverage enhancement level for resources assigned by the SPS based on the configuration or the downlink control message as described with reference to FIGS. 2-5. In certain examples, the operations of block 1615 may be performed by the CE level module 715 as described with reference to FIG. 7 or the SPS manager 910 as described with reference to FIG. 9.

At block 1620, the UE 115 may communicate with a base station on the resources assigned by the SPS according to the coverage enhancement level as described with reference to FIGS. 2-5. In certain examples, the operations of block 1620 may be performed by the CE level module 715 as described with reference to FIG. 7 or the transceiver 935 as described with reference to FIG. 9.

At block 1625, the UE 115 may receive a second downlink control message that includes a dynamic assignment of resources as described with reference to FIGS. 2-5. In certain examples, the operations of block 1625 may be performed by the dynamic resources module 805 as described with reference to FIG. 8 or the transceiver 935 as described with reference to FIG. 9.

At block 1630, the UE 115 may determine that the resources assigned by the dynamic assignment overlap with the resources assigned by the SPS as described with reference to FIGS. 2-5. In certain examples, the operations of block 1630 may be performed by the dynamic resources module 805 as described with reference to FIG. 8 or the SPS manager 910 as described with reference to FIG. 9.

Figure 17:
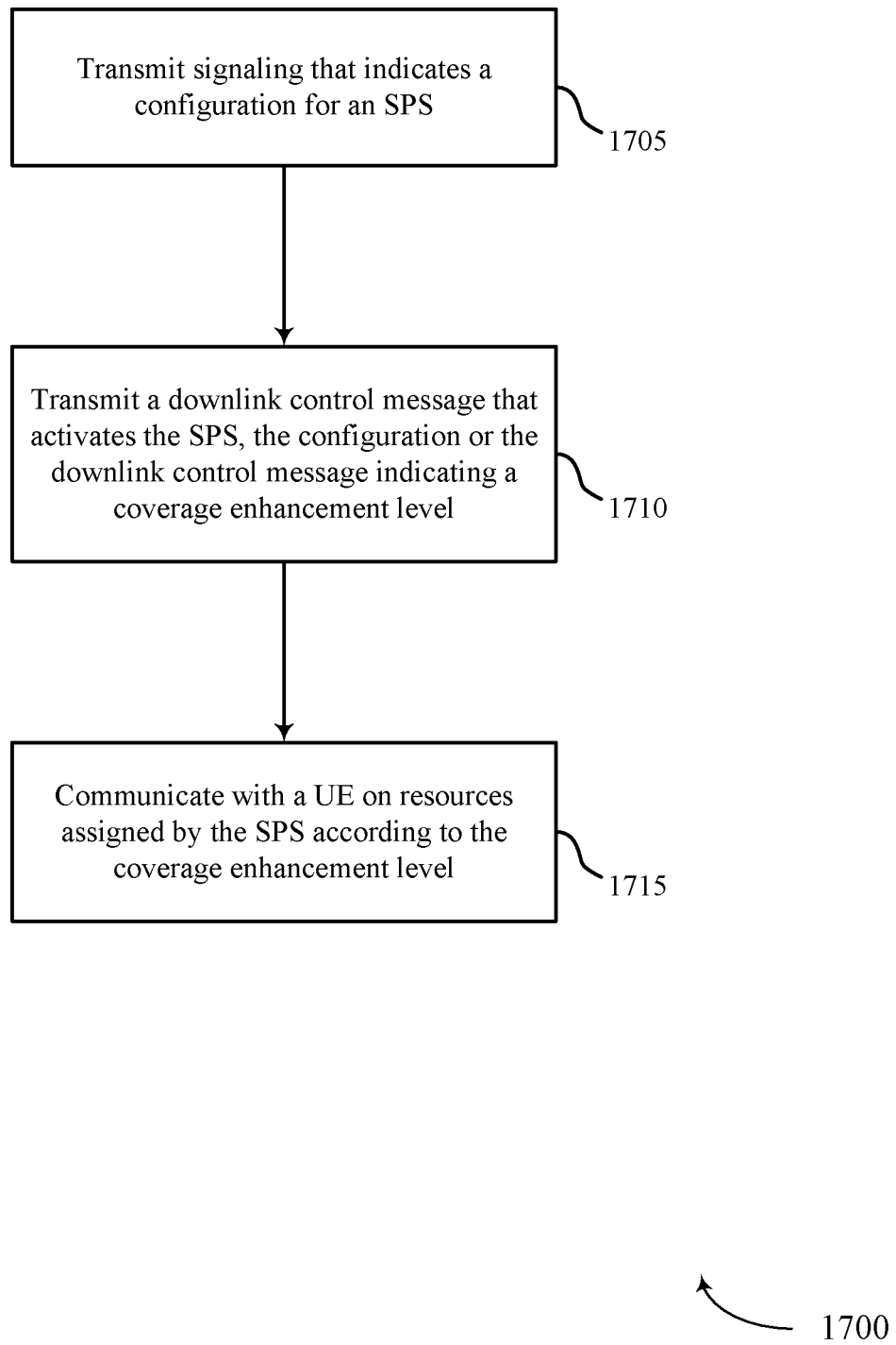

FIG. 17 shows a flowchart illustrating a method 1700 that supports SPS for eMTC in accordance with various aspects of the present disclosure. The operations of method 1700 may be implemented by a base station 105 or its components as described with reference to FIGS. 1-13. For example, the operations of method 1700 may be performed by the base station SPS manager 1010 or 1310 or transceiver 1335, as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware.

At block 1705, the base station 105 may transmit signaling that indicates a configuration for an SPS as described with reference to FIGS. 2-5. In certain examples, the operations of block 1705 may be performed by the BS SPS configuration module 1105 as described with reference to FIG. 11 or the transceiver 1335 as described with reference to FIG. 13.

At block 1710, the base station 105 may transmit a downlink control message that activates the SPS, where the configuration or the downlink control message indicates a coverage enhancement level as described with reference to FIGS. 2-5. In certain examples, the operations of block 1710 may be performed by the BS SPS activation module 1110 as described with reference to FIG. 11 or the transceiver 1335 as described with reference to FIG. 13.

At block 1715, the base station 105 may communicate with a UE on resources assigned by the SPS according to the coverage enhancement level as described with reference to FIGS. 2-5. In certain examples, the operations of block 1715 may be performed by the BS CE level module 1115 as described with reference to FIG. 11 or the transceiver 1335 as described with reference to FIG. 13.

Thus, methods 1400, 1500, 1600, and 1700 may provide that supports SPS for eMTC. It should be noted that methods 1400, 1500, 1600, and 1700 describe possible implementation, and that the operations and the steps may be rearranged or otherwise modified such that other implementations are possible. In some examples, aspects from two or more of the methods 1400, 1500, 1600, and 1700 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, Universal Mobile Telecommunications System (UMTS), LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   receiving signaling that indicates a configuration for semi-persistent scheduling (SPS);
   receiving a downlink control message that activates the SPS;
   determining a coverage enhancement level for resources assigned by the SPS based at least in part on the configuration or the downlink control message;
   receiving a second downlink control message that comprises a dynamic assignment of resources;
   determining that the resources assigned by the dynamic assignment overlap with the resources assigned by the SPS; and
   communicating with a base station on the resources assigned by the SPS according to the coverage enhancement level and based at least in part on the dynamic assignment of resources.

2. The method of claim 1, further comprising:
   determining a periodicity of the resources assigned by the SPS based at least in part on the coverage enhancement level.

3. The method of claim 1, further comprising:
   determining that an uplink data buffer is empty during a transmission period of the configuration, wherein the configuration comprises an uplink SPS configuration; and
   refraining from transmitting on the resources assigned by the SPS during the transmission period based at least in part on the determination that the uplink data buffer is empty.

4. The method of claim 3, further comprising:
   receiving an indication to determine whether the uplink data buffer is empty during the transmission period of the configuration, wherein the refraining from transmitting is based at least in part on the indication.

5. The method of claim 3, further comprising:
   incrementing a counter based at least in part on the refraining from transmitting on the resources;
   determining that the counter has value that exceeds a threshold; and
   releasing the SPS based at least in part on the determination that the counter exceeds the threshold.

6. The method of claim 1, further comprising:
   refraining from communicating on at least a portion of the resources assigned by the SPS based at least in part on the determination that the resources assigned by the dynamic assignment overlap with the resources assigned by the SPS.

7. The method of claim 6, wherein the resources assigned by the SPS comprise bundled transmission time intervals (TTIs), and wherein the refraining from communicating comprises:
   refraining from communicating for at least one bundle of TTIs.

8. The method of claim 1, further comprising:
   releasing the SPS based at least in part on determining that the resources assigned by the dynamic assignment overlap with the resources assigned by the SPS.

9. The method of claim 1, further comprising:
   refraining from communicating on the resources assigned by the dynamic assignment based at least in part on determining that the resources assigned by the dynamic assignment overlap with the resources assigned by the SPS.

10. The method of claim 9, wherein the refraining from communicating is based at least in part on whether the configuration comprises an uplink configuration or a downlink configuration.

11. The method of claim 1, wherein determining the coverage enhancement level comprises:
    selecting the coverage enhancement level from a set of coverage enhancement levels, wherein the set comprises a level that corresponds to no coverage enhancements.

12. A method of wireless communication, comprising:
    transmitting signaling that indicates a configuration for semi-persistent scheduling (SPS);
    transmitting a downlink control message that activates the SPS, wherein the configuration or the downlink control message indicates a coverage enhancement level;
    transmitting a second downlink control message that comprises a dynamic assignment of resources, wherein the resources assigned by the dynamic assignment overlap with resources assigned by the SPS; and
    communicating with a user equipment (UE) on the resources assigned by the SPS according to the coverage enhancement level and based at least in part on the resources assigned by the dynamic assignment.

13. The method of claim 12, further comprising:
    identifying a set of periodicities for each of a plurality of coverage enhancement levels; and
    selecting a periodicity from each set of periodicities, wherein the configuration for the SPS comprises the periodicity from each set.

14. The method of claim 12, wherein the signaling that indicates the configuration for SPS comprises an indication for the UE to refrain from transmitting during a transmission period of the configuration when an uplink data buffer of the UE is empty.

15. An apparatus for wireless communication, comprising:
    means for receiving signaling that indicates a configuration for semi-persistent (SPS);
    means for receiving a downlink control message that activates the SPS;
    means for determining a coverage enhancement level for resources assigned by the SPS based at least in part on the configuration or the downlink control message;
    means for receiving a second downlink control message that comprises a dynamic assignment of resources;
    means for determining that the resources assigned by the dynamic assignment overlap with the resources assigned by the SPS; and
    means for communicating with a base station on the resources assigned by the SPS according to the coverage enhancement level and based at least in part on the dynamic assignment of resources.

16. The apparatus of claim 15, further comprising:
means for determining a periodicity of the resources assigned by the SPS based at least in part on the coverage enhancement level.

17. The apparatus of claim 15, further comprising:
means for determining that an uplink data buffer is empty during a transmission period of the configuration, wherein the configuration comprises an uplink SPS configuration; and
means for refraining from transmitting on the resources assigned by the SPS during the transmission period based at least in part on the determination that the uplink data buffer is empty.

18. The apparatus of claim 17, wherein the means for receiving the signaling that indicates the configuration for SPS comprises means for receiving an indication to determine whether the uplink data buffer is empty during the transmission period of the configuration, and wherein the means for refraining from transmitting is operable based at least in part on the indication.

19. The apparatus of claim 17, further comprising:
means for incrementing a counter based at least in part on the refraining from transmitting on the resources;
means for determining that the counter has value that exceeds a threshold; and
means for releasing the SPS based at least in part on the determination that the counter exceeds the threshold.

20. The apparatus of claim 15, further comprising:
means for refraining from communicating on at least a portion of the resources assigned by the SPS based at least in part on the determination that the resources assigned by the dynamic assignment overlap with the resources assigned by the SPS.

21. The apparatus of claim 20, wherein the means for refraining from communicating comprises:
means for refraining from communicating for at least one bundle of transmission time intervals (TTIs), wherein the resources assigned by the SPS comprise bundled transmission TTIs.

22. The apparatus of claim 15, further comprising:
means for releasing the SPS based at least in part on determining that the resources assigned by the dynamic assignment overlap with the resources assigned by the SPS.

23. The apparatus of claim 15, further comprising:
means for refraining from communicating on the resources assigned by the dynamic assignment based at least in part on determining that the resources assigned by the dynamic assignment overlap with the resources assigned by the SPS.

24. The apparatus of claim 23, wherein the means for refraining from communicating are operable based at least in part on whether the configuration comprises an uplink configuration or a downlink configuration.

25. The apparatus of claim 15, wherein means for determining the coverage enhancement level comprises:
means for selecting the coverage enhancement level from a set of coverage enhancement levels, wherein the set comprises a level that corresponds to no coverage enhancements.

26. An apparatus for wireless communication, comprising:
means for transmitting signaling that indicates a configuration for semi-persistent scheduling (SPS);
means for transmitting a downlink control message that activates the SPS, wherein the configuration or the downlink control message indicates a coverage enhancement level;
means for transmitting a second downlink control message that comprises a dynamic assignment of resources, wherein the resources assigned by the dynamic assignment overlap with resources assigned by the SPS; and
means for communicating with a user equipment (UE) on the resources assigned by the SPS according to the coverage enhancement level and based at least in part on the resources assigned by the dynamic assignment.

27. The apparatus of claim 26, further comprising:
means for identifying a set of periodicities for each of a plurality of coverage enhancement levels; and
means for selecting a periodicity from each set of periodicities, wherein the configuration for the SPS comprises the periodicity from each set.

28. An apparatus for wireless communication, comprising:
a processor;
memory in electronic communication with the processor; and
instructions stored in the memory and operable, when executed by the processor, to cause the apparatus to:
receive signaling that indicates a configuration for semi-persistent scheduling (SPS);
receive a downlink control message that activates the SPS;
determine a coverage enhancement level for resources assigned by the SPS based at least in part on the configuration or the downlink control message;
receive a second downlink control message that comprises a dynamic assignment of resources;
determine that the resources assigned by the dynamic assignment overlap with the resources assigned by the SPS; and
communicate with a base station on the resources assigned by the SPS according to the coverage enhancement level and based at least in part on the dynamic assignment of resources.

29. The apparatus of claim 28, wherein the instructions are operable to cause the apparatus to:
determine a periodicity of the resources assigned by the SPS based at least in part on the coverage enhancement level.

30. The apparatus of claim 28, wherein the instructions are operable to cause the apparatus to:
determine that an uplink data buffer is empty during a transmission period of the configuration, wherein the configuration comprises an uplink SPS configuration; and
refrain from transmitting on the resources assigned by the SPS during the transmission period based at least in part on the determination that the uplink data buffer is empty.

31. The apparatus of claim 30, wherein the instructions are operable to cause the apparatus to:
receive an indication to determine whether the uplink data buffer is empty during the transmission period of the configuration; and
refrain from transmitting is based at least in part on the indication.

32. The apparatus of claim 30, wherein the instructions are operable to cause the apparatus to:
increment a counter based at least in part on the refraining from transmitting on the resources;

determine that the counter has value that exceeds a threshold; and release the SPS based at least in part on the determination that the counter exceeds the threshold.

33. The apparatus of claim 28, wherein the instructions are operable to cause the apparatus to:

refrain from communicating on at least a portion of the resources assigned by the SPS based at least in part on the determination that the resources assigned by the dynamic assignment overlap with the resources assigned by the SPS.

34. The apparatus of claim 33, wherein the resources assigned by the SPS comprise bundled transmission time interval (TTIs), and wherein the instructions are operable to cause the apparatus to:

refrain from communicating for at least one bundle of TTIs.

35. The apparatus of claim 28, wherein the instructions are operable to cause the apparatus to:

release the SPS based at least in part on determining that the resources assigned by the dynamic assignment overlap with the resources assigned by the SPS.

36. The apparatus of claim 28, wherein the instructions are operable to cause the apparatus to:

from communicating on the resources assigned by the dynamic assignment based at least in part on determining that the resources assigned by the dynamic assignment overlap with the resources assigned by the SPS.

37. The apparatus of claim 36, wherein the instructions are operable to cause the apparatus to:

refrain from communicating is based at least in part on whether the configuration comprises an uplink configuration or a downlink configuration.

38. The apparatus of claim 28, wherein the instructions are operable to cause the apparatus to:

select the coverage enhancement level from a set of coverage enhancement levels, wherein the set comprises a level that corresponds to no coverage enhancements.

39. An apparatus for wireless communication, comprising:

a processor;
memory in electronic communication with the processor; and
instructions stored in the memory and operable, when executed by the processor, to cause the apparatus to:
transmit signaling that indicates a configuration for semi-persistent scheduling (SPS);
transmit a downlink control message that activates the SPS, wherein the configuration or the downlink control message indicates a coverage enhancement level;
transmit a second downlink control message that comprises a dynamic assignment of resources, wherein the dynamic assignment overlaps with resources assigned by the SPS; and
communicate with a user equipment (UE) on the resources assigned by the SPS according to the coverage enhancement level and based at least in part on the dynamic assignment of resources.

40. The apparatus of claim 39, wherein the instructions are operable to cause the apparatus to:

identify a set of periodicities for each of a plurality of coverage enhancement levels; and
select a periodicity from each set of periodicities, wherein the configuration for the SPS comprises the periodicity from each set.

41. A non-transitory computer-readable medium storing code for wireless communication, the code comprising instructions executable to:

receive signaling that indicates a configuration for semi-persistent scheduling (SPS);
receive a downlink control message that activates the SPS;
determine a coverage enhancement level for resources assigned by the SPS based at least in part on the configuration or the downlink control message;
receive a second downlink control message that comprises a dynamic assignment of resources;
determine that the resources assigned by the dynamic assignment overlap with the resources assigned by the SPS; and
communicate with a base station on the resources assigned by the SPS according to the coverage enhancement level and based at least in part on the dynamic assignment of resources.

42. The non-transitory computer-readable medium of claim 41, wherein the instructions are executable to:

determine a periodicity of the resources assigned by the SPS based at least in part on the coverage enhancement level.

43. The non-transitory computer-readable medium of claim 41, wherein the instructions are executable to:

determine that an uplink data buffer is empty during a transmission period of the configuration, wherein the configuration comprises an uplink SPS configuration; and
refrain from transmitting on the resources assigned by the SPS during the transmission period based at least in part on the determination that the uplink data buffer is empty.

44. The non-transitory computer-readable medium of claim 43, wherein the instructions are executable to:

increment a counter based at least in part on the refraining from transmitting on the resources;
determine that the counter has value that exceeds a threshold; and
release the SPS based at least in part on the determination that the counter exceeds the threshold.

45. The non-transitory computer-readable medium of claim 41, wherein the instructions are executable to:

refrain from communicating on at least a portion of the resources assigned by the SPS based at least in part on the determination that the resources assigned by the dynamic assignment overlap with the resources assigned by the SPS.

46. The non-transitory computer-readable medium of claim 45, wherein the resources assigned by the SPS comprise bundled transmission time interval (TTIs), and wherein the instructions are executable to:

refrain from communicating for at least one bundle of TTIs.

47. The non-transitory computer-readable medium of claim 41, wherein the instructions are executable to:

release the SPS based at least in part on determining that the resources assigned by the dynamic assignment overlap with the resources assigned by the SPS.

48. The non-transitory computer-readable medium of claim 41, wherein the instructions are executable to:

refrain from communicating on the resources assigned by the dynamic assignment based at least in part on determining that the resources assigned by the dynamic assignment overlap with the resources assigned by the SPS.

49. The non-transitory computer-readable medium of claim 48, wherein the refraining from communicating is based at least in part on whether the configuration comprises an uplink configuration or a downlink configuration.

50. The non-transitory computer-readable medium of claim 41, wherein the instructions are executable to:
select the coverage enhancement level from a set of coverage enhancement levels, wherein the set comprises a level that corresponds to no coverage enhancements.

51. A non-transitory computer-readable medium storing code for wireless communication, the code comprising instructions executable to:
transmit signaling that indicates a configuration for semi-persistent scheduling (SPS);
transmit a downlink control message that activates the SPS, wherein the configuration or the downlink control message indicates a coverage enhancement level;
transmit a second downlink control message that comprises a dynamic assignment of resources, wherein the dynamic assignment overlaps with resources assigned by the SPS; and
communicate with a user equipment (UE) on the resources assigned by the SPS according to the coverage enhancement level and based at least in part on the dynamic assignment of resources.

52. The non-transitory computer-readable medium of claim 51, wherein the instructions are executable to:
identify a set of periodicities for each of a plurality of coverage enhancement levels; and
select a periodicity from each set of periodicities, wherein the configuration for the SPS comprises the periodicity from each set.

* * * * *